United States Patent
Patel et al.

(10) Patent No.: US 7,142,736 B2
(45) Date of Patent: Nov. 28, 2006

(54) DISTRIBUTED FIBER SENSOR WITH INTERFERENCE DETECTION AND POLARIZATION STATE MANAGEMENT

(75) Inventors: Jayantilal S. Patel, Newtown, PA (US); Zhizhong Zhuang, Bensalem, PA (US); Yuri Zadorozhny, West Trenton, NJ (US)

(73) Assignee: Optellios, Inc., Langhorne, PA (US)

( * ) Notice: Subject to any disclaimer, the term of this patent is extended or adjusted under 35 U.S.C. 154(b) by 27 days.

(21) Appl. No.: 10/919,547

(22) Filed: Aug. 16, 2004

(65) Prior Publication Data

US 2005/0147341 A1    Jul. 7, 2005

Related U.S. Application Data

(60) Provisional application No. 60/576,434, filed on Jun. 3, 2004, provisional application No. 60/572,169, filed on May 18, 2004, provisional application No. 60/556,979, filed on Mar. 26, 2004, provisional application No. 60/555,163, filed on Mar. 22, 2004, provisional application No. 60/542,005, filed on Feb. 5, 2004, provisional application No. 60/534,264, filed on Jan. 5, 2004.

(51) Int. Cl.
  *G02B 6/00* (2006.01)
(52) U.S. Cl. .............................. 385/12; 398/13; 398/20
(58) Field of Classification Search ................. 385/12, 385/13; 398/10, 13, 15, 17, 20
See application file for complete search history.

(56) References Cited

U.S. PATENT DOCUMENTS

| | | | | |
|---|---|---|---|---|
| 4,897,543 A | * | 1/1990 | Kersey | 250/227.27 |
| 6,194,707 B1 | * | 2/2001 | Yang | 250/227.15 |
| 6,621,947 B1 | | 9/2003 | Tapanes et al. | |
| 6,721,502 B1 | * | 4/2004 | Al-Salameh et al. | 398/3 |
| 6,778,717 B1 | | 8/2004 | Tapanes et al. | |
| 6,897,424 B1 | * | 5/2005 | Suzuki | 250/205 |
| 2004/0047628 A1 | * | 3/2004 | Passier et al. | 398/15 |

FOREIGN PATENT DOCUMENTS

GB    1 497 995    1/1978

OTHER PUBLICATIONS

Anthony Dandridge and Alan D. Kersey, "Overview of Mach-Zehnder Sensor Technology and Applications," Fiber Optic and Laser Sensors VI, Proc. SPIE vol. 985, pp. 34-52 (1988).
Bogdan Kizlik, "Fiber Optic Distributed Sensor in Mach-Zehnder Interferometer Configuration," TCSET2002 Lviv- Slavsko, Ukraine.
Moshe Tur, Yuval S. Boger, and H.J. Shaw, "Polarization-Induced Fading in Fiber-Optic Sensor Arrays," Journal of Lightwave Technology, vol. 13, No. 7, p. 1269-1276, Jul. 1995.

(Continued)

*Primary Examiner*—Sung Pak
(74) *Attorney, Agent, or Firm*—Duane Morris LLP

(57) ABSTRACT

Polarization effects are managed to provide differential timing information for localizing disturbances affecting two or more counter-propagating light signals on one or more optical waveguides passing through a detection zone. Activity can be localized to a point for a security perimeter. Events causing optical disturbance can be mapped to points along a straight line, a perimeter or arbitrary pattern or an array. Events cause local changes in optical properties in the optical waveguide, in particular an optical fiber. Short term local changes are distinguishable from phase changes of light travel in the waveguide by managing the polarization state of input and output beams.

56 Claims, 13 Drawing Sheets

OTHER PUBLICATIONS

Alan D. Kersey, Michael J. Marrone, and Anthony Dandridge, "Analysis of Input-Polarization-Induced Phase Noise in Interferometric Fider-Optic Sensors and Its Reduction Using Polarization Scrambling," Journal of Lightwave Technology, vol. 8, No. 6, Jun. 1990.

David W. Stowe, Douglas R. Moore and Richard G. Priest, "Polarization Fading in Fiber Interferometric Sensors," IEEE Journal of Quantum Electronics, vol. QE-18, Nov. 10, Oct. 1982.

* cited by examiner

DISTRIBUTED FIBER SENSOR WITH INTERFERENCE DETECTION AND POLARIZATION STATE MANAGEMENT

CROSS REFERENCE TO RELATED APPLICATIONS

This application claims the priority of U.S. Provisional Patent Applications Ser. No. 60/534,264, filed Jan. 5, 2004; Ser. No. 60/542,005, filed Feb. 5, 2004; Ser. No. 60/555,163, filed Mar. 22, 2004; Ser. No. 60/556,979, filed Mar. 26, 2004; Ser. No. 60/572,169, filed May 18, 2004; and Ser. No. 60/576,434, filed Jun. 3, 2004.

BACKGROUND OF THE INVENTION

1. Field of the Invention

The invention concerns a detection and locating apparatus and method using an optical fiber or similar waveguide as a distributed sensor by which a disturbance can be sensed and its location determined to a point along the path of the optical fiber. According to an inventive aspect, polarization effects managed to make such detection dependable notwithstanding changing conditions, and to provide a robust ratio of signal to noise.

In one embodiment, two light signals are developed and coupled into two counter-propagating light signal channels carried by at least one waveguide. The counter-propagating light signals are locally affected by substantially the same physical disturbance, for example, an increase in pressure or a vibration or the like, that may deform the fiber and at least affects the optical propagation conditions locally. A resulting change is detected in the two counter-propagating light signals, with a temporal shift resulting from the light signals having propagated along different paths of potentially different length. From the temporal shift, a processor calculates the location along the path at which the disturbance affected the counter-propagating light signals.

The waveguide can be an optical fiber or two or more optical fibers or plural modes in a given fiber, in each case supporting propagation of a beam in the waveguide. The opposite light signals can originate from different light sources and/or can be subdivided beams from a same source, such as subdivided portions of a coherent laser beam. Although propagating in opposite directions, the two light signals are affected by the disturbance in substantially the same way but propagate over distances and times that are independent of one another.

Physical disturbances such as pressure or stress from moving masses and other events of potential security interest cause polarization altering changes in both of the counter-propagating optical signals. Such changes are detectable according to the invention with sensitivity and precision. The optical fiber waveguide medium is insensitive to electromagnetic interference, intrinsically safe, stable and reliable. However, at the scale of the wavelength of the light signals, momentary stresses and the like produce variations that are readily detectable as phase variations leading to a change in polarization states.

Although the disclosed technology can be applied to various position sensing situations, this disclosure uses the example of optical fiber based perimeter security as a non-limiting example. Inasmuch as an optical waveguide is easily placed to follow various paths, the same technique can be used to extend a detection path between arbitrary zones, to provide a two or three dimensional detection area, etc.

2. Prior Art

A security system should detect and provide information about any intrusion into a protected area or facility. An advantageous system should discreetly detect even modest physical disturbances, and report the location of the disturbance so as to permit corrective action to ensue promptly. If a security system is not visible or otherwise apparent to an intruder, it is more difficult for the intruder to proceed undetected than if elements of the security system are not concealed. There may be a deterrence benefit, however, in making it known that a facility is equipped with security devices.

Some optical sensors rely on gross effects of an intruder's presence, such as the intruder interrupting a beam that is aimed from a source to a sensor. Other sensors rely on proximity or the like. Whether the effect is gross or subtle, there is a need to know not only that a disturbance has occurred but also to know where the disturbance occurred. With one signal path, it may be possible from changes in the received signal to determine that a disturbance has occurred, but not to know where. One technique for localizing a disturbance is by determining the difference in timing between the appearance of effects of a disturbance, in two signals that are both affected by the disturbance. A relative delay in appearance of the disturbance in a signal propagating on one path versus another path, indicates a longer propagation distance from the disturbance to the detector where the signal is detected. If there are two or more operative paths, measuring the delay can permit one to calculate an apparent location of the disturbance. This technique is described in British Patent GB 1,497,995— Ramsay, entitled "Fiber Optic Acoustic Monitoring Arrangement."

Optical fiber has inherent advantages, such as low loss, immunity to electromagnetic interference and other characteristics, that are useful in remote sensing. Optical fiber interference sensors as in Ramsay have the additional advantages of geometric versatility (i.e., the fiber can follow almost any desired route), wide dynamic range, and high sensitivity, partly due to the very short wavelength of the electromagnetic radiation (light energy) that is carried in an optical fiber. The measurement of the delay in Ramsay and other similar detectors is the phase difference between light from a given source, received over two different paths, such as counter-propagating paths, of potentially different length. The phase difference is detected at the receiving end of both paths, by causing the light from the two fibers to interfere, i.e., to add constructively or destructively at a summing node. As the signals move in and out of phase, the intensity of the interference sum varies between a maximum and a minimum.

An example of an interference sensor is the Mach-Zehnder interferometer, which has been applied to acoustic sensing, magnetic sensing, temperature sensing, pressure sensing, structure monitoring, etc, including using optical fibers, as described in "Overview of Mach-Zehnder sensor Technology and Applications" by Anthony Dandridge and Alan D. Kersey, Fiber Optic and Laser Sensors VI, Proc. SPIE Vol. 985, pp. 34–52 (1988).

In addition to GB 1,497,995—Ramsay, cited above, the publication "Fiber Optic Distributed Sensor in Mach-Zehnder Interferometer Configuration" by Bogdan Kizlik, TCSET'2002 Lviv-Slavsko, Ukraine proposes location fixing techniques. Recent US Patents and publications including U.S. Pat. No. 6,621,947 and US 2003198425 teach the possibility of a perimeter defense system based on the same principle.

These prior art teachings rely on interference of periodic waves to produce a variation in intensity that reflects the parameter that is needed to determine a location from a difference in propagation time over two distinct signal paths. For example, the disturbance may induce a change in propagation conditions such as a local change in optical index. Such a change effectively shortens or elongates the optical path. Where two beams traverse the optical path, both beams are affected. The effect of the disturbance on either one of the two signals is a phase shift, reaching the detector after that signal has propagated from the disturbance to the detector. An interference summing node is effectively a phase comparator. According to the theory, for a time between arrival at the detector of the first phase shifted signal along one path, and arrival of the second phase shifted signal along a different path, a short term phase difference persists between the two received signals. As a result, if the interfering signals produced a given intensity amplitude due to the constructive or destructive positioning of their phases, that amplitude changes upon arrival of the first signal and returns to its previous level upon arrival of the second signal. The time span is a function of the difference in distances from the detector to the disturbance along the two paths. From the time difference and information as to whether the phase difference leads or lags, the disturbance can be located to a point. {It will till work even if it is in the middle, just means that the time difference is zero.}

There is a problem, however, in applying the theory. Light energy is not a simple planar wave, and optical waveguides induce polarization effects. When attempting to use optical fiber waveguides and the like for location detection in this way, polarization effects and polarization induced phase delays can defeat the ability of an interferometer to produce a robust and dependable signal.

Light waves have mutually orthogonal polarization vector components that can be relatively large or small in comparison to one another, and can vary in their phase relationship. For light waves to interfere, there must be an extent of correspondence in their polarization states. Two light waves that are orthogonally polarized cannot interfere. Over plural paths between a light source and two or more detectors, each passing a point of disturbance, the birefringence of different paths and fibers can change the polarization alignment of a light signal. Birefringence changes polarization alignment by inducing a phase difference between two orthogonal components of a light signal. Thus, the change in polarization alignment can involve a phase difference of its own. Although an optical fiber may have small birefringence as compared to its refractive index, an accumulated polarization effect arises, particularly over a long distance, and the effect can be large on the scale of wavelength. An interferometer-based system cannot perform consistently, and in some circumstances will not perform at all, if polarization effects cause the polarization states of the counter-propagating optical signals that are intended to interfere actually to vary between states wherein the constituent components of the signals are more or less parallel and more or less orthogonal at different times.

Adverse effects on interfering beams due to polarization state changes over a single light path is known as polarization-induced fading. The problem is described, for example, in "Polarization-induced Fading in Fiber-Optic Sensor Arrays" (Moshe Tur, Yuval S. Boger, and H. J. Shaw, Journal of Lightwave Technology, Vol. 13, No. 7, p 1269, 1995). This publication seeks to enhance the visibility of the interference beam in a single-channel fiber based interferometer, where the light travels along a single direction.

Polarization induced phase shift is a somewhat different effect from polarization induced fading, but causes measurement problems because polarization induced phase shift can be difficult to distinguish from other factors. If there is a polarization induced phase shift, the effective phase shifts may not correlate well between the two counter propagating signals received at the detector. The technique of calculating a location for the disturbance relies on identifying corresponding phase shifts in each of the two counter-propagating signals and measuring the lead/lag time between their appearance at the detector. Such a measurement is not possible if variations in the two signals cannot be matched.

Polarization phase shift variations arise in part because there are dynamically varying changes to the polarization states of the light signals between the signals as they are launched, versus the principal polarization axis of the interferometer at which the received signals can potentially interfere constructively or destructively. The difference varies as a function of the birefringent state of the fiber along the two counter-propagation paths. If the states of polarization of the two interfering beams are not parallel to each other, then the intensity response due to the interference will be affected according to the alignment or misalignment of the vector components of the two beams. The polarization state of a light signal involves not only the angular alignment of its orthogonal components but also a phase relationship at a given point along a propagation axis. Dynamic changes along the propagation paths induce phase factors depending on the mismatch of polarization alignments; and the depth or span of potential intensity modulation due to interference is reduced (signal fading).

This polarization dependent effect, which can be termed the polarization induced phase shift, depends on the polarization mismatch. The change in polarization state between the point of launch and the point of detection (interference) generally is not the same for the two counter-propagating light signals. However, a temporal difference between corresponding phase changes in the counter-propagating light signals is to be the parameter used for localizing the disturbance. The unequal additional polarization induced phase shift results in errors in determining the correct location.

An interferometer produces an intensity response by causing phase varying signals to add or to cancel at different phase positions (i.e., to interfere), and as a result, the effect of polarization fading and polarization induced phase shift can be quite detrimental, leading to system failure if precautions are not taken. Occasional or uncontrollable system failure is unacceptable for a system deployed for security purposes. GB 1,497,995—Ramsay (supra) and other known fiber based perimeter security systems as described, detect variations in intensity from interfering two beams and are subject to fading and phase shift with changes in polarization of beams passed through a fiber interferometer in opposite directions. This limits effectiveness of such systems.

SUMMARY OF THE INVENTION

It is an object of the present invention to avoid fading and phase shift problems by establishing conditions that provide a robust response notwithstanding time changing polarization transformation characteristics along the optical paths, such as birefringence. According to one inventive aspect, a polarization characteristic of the signal is advantageously controlled using at least one polarization controller. The invention not only provides a versatile and effective disturbance detection system but also solves the prior art difficulty with polarization fading and polarization induced phase shift. This makes the invention practical and effective in perimeter security systems, as well as distributed sensing for various other purposes. A number of variations on this inventive concept are discussed herein.

It is an object of the invention to provide a fail safe solution to polarization fading and polarization induced phase shift, where two or more light signals are propagated over paths of potentially different lengths, particularly counter-propagating signals, in a location resolving event detection system. That is, a system is provided wherein the normal change in light propagation conditions cannot result in a failure state that prevents system operation.

The polarization aspect of the signal advantageously can be adjusted for the accurate location of the event. Ideally the state of polarization for the two interfering beams should be controlled to be substantially parallel to each other when they interfere with each other, so as to avoid polarization induced signal fading and the polarization induced phase shift. According to one aspect of the invention, intensity criteria can be used as an input to a feedback control for adjusting one or more polarization controls to maximize the amplitude of the intensity signal, i.e., to achieve the greatest available span between maximum and minimum levels of constructive and destructive interference. In other words, the feedback controls to the polarization controller are arranged to make the depth of modulation of the interference signal as large as possible. This approach is effective because when the polarization states of the interfering beams are matched, the intensity can reach the minimum or maximum possible value.

To obtain a maximum value and maximum swing in intensity, two conditions are addressed, namely the state of polarization and also phase relation. A steady state condition can be assumed when prepared or primed to detect a disturbance. For enabling deflection to a maximum output at the interference summing junction, (a) the polarization orientations of the two beams are aligned; and, (b) the phase difference between the two beams is set to zero. Similarly, in order to obtain a minimum value of intensity, (a) the polarization of the two beams are aligned; and (b) the phase difference between the two beams is $\pi$ radians.

In a real world practical system, natural variations such as temperature and other physical variations produce time dependent intrinsic phase variations. These can cause the amplitude of interference intensity to change with time. Additional phase variations in the system arise because of the aforementioned polarization induced phase factors, which, however, are coupled with the signal fading effect.

In order to realize or approach the maximum and minimum possible values of the interference sum, and thus to have the best available depth of modulation, the intrinsic phase fluctuations of the system can be relied upon to produce peak amplitude levels that can be detected to provide the basis for control. Preferably, however, according to an aspect of the invention a polarization controller is placed between the light source and the optical system and is operated so as to provide controlled variability. This enables the establishment of a polarization state relationship between the beams a the interference summing junction that will produce a strong signal level, i.e., a robust variation between maximum and minimum interference intensity levels, due to a disturbance.

An aspect of the invention is actively to manage the polarization conditions to cause the polarization transformation functions of the two counter-propagating optical channels to be substantially identical to one another in a steady state condition. By balancing the two polarization transformations, the polarization mismatch for the counter-propagating optical signals will always be the same. As a result, the location of the disturbance can be localized accurately because the effective phase for the two counter propagating signals is substantially the same and the phase difference between them (the lead/lag time used to calculate the location) can be determined dependably and accurately.

These and other aspects of the invention are met in a method and apparatus that manages polarization effects to provide differential timing information for localizing disturbances affecting two or more counter-propagating light signals coupled through a same detection zone. The technique is useful for sensing movement at distributed points along a security perimeter, or in general to locate the position of occurrences along a path that can be a straight line, a perimeter or pattern or a member of an array. The occurrences produce detectable local changes in physical properties in an optical waveguide, such as an optical fiber. Short term changes are made distinct and distinguishable, by managing the polarization state of input and output beams. The short term intensity response caused by the same disturbance in two or more counter-propagating signals is discerned and resolved as a phase alteration that affects the respective signals. The lead/lag between the times between the onset (or other reference point) of the phase variations in the two signals is measured and used to calculate the point along the waveguide, at least within a tolerance, where the disturbance occurred.

For these purposes, at least one light source is configured to carry two or more counter-propagating optical signals. Each of the signals contains two or more beams with polarization attributes. The signals are passed through an optical system including at least one length of optical waveguide forming a detection zone along which the disturbance could occur at any place. Although the beams are both affected by the disturbance, the beams pass along paths of different lengths to a detection point. Preferably the beams pass in opposite directions. For inserting the beams, a beam separator can develop two or more beams from the same light source, such as a coherent laser signal, coupled into the two counter-propagating or otherwise directed optical signals.

The beams are applied to a detector through the optical waveguide, such that a physical event in the detection zone along the waveguide acts on both of the two counter-propagating optical signals, causing a disturbance in optical properties. The output of the detector is processed to localize the disturbance. The detector can include a processor that calculates backwards upon detecting a short term change in the received beams, detected at different times. The processor infers from the lead/lag time a difference in propagation time between the event and the detector, and converts the difference to a location in the detection zone. The lead/lag time appears as a phase difference between the signals in which the effect of the disturbance appears, producing a changing change in the amplitude of the interference signal developed by interfering together the two channels at the detector. The disturbance is normally due to a physical event in the vicinity of the disturbance, such as the stress or vibration of a passing person or vehicle, the opening or closing of a portal such as a gate, door or window, a displacement or breakage, an acoustic wave, or any similar event.

There are several variations in configuration possible including tuning of the input signal wavelength, using one or more fibers or fiber transmission modes, splitting the beams from one or more coherent laser source or another light sources. According to a particular inventive aspect, the polarization state of the light on the input side can be adjusted or varied so as to achieve or maintain a relationship between the interfering beams, or components of the beams, at the detector. In this way, a short term deflection of the physical characteristics due to the occurrence can be detected.

These and other objects will be made apparent by the following discussion of several embodiments and variations, by way of non-limiting example.

BRIEF DESCRIPTION OF THE DRAWINGS

There are shown in the drawings exemplary embodiments to illustrate the invention as presently preferred. The invention is capable of these and other embodiments, and it should be appreciated that the scope of the invention is defined by the claims as opposed to this description of illustrative examples. In the drawings.

DETAILED DESCRIPTION

The invention manages variations in polarization aspects of two or more light signals, in a system that uses interference between the light beams for counter-propagating light signals in discerning the location along an extended waveguide at which a detectable occurrence has disturbed the light propagation conditions for both light signals. The disturbance locally affects two counter-propagating optical signals simultaneously, but is detected after the affected light beams have propagated along paths of different length.

Corresponding signal variations are received from the two signals at different times due to the different path lengths. These variations comprise intensity variation caused by the phase variations that result from a disturbance-induced change in optical propagation conditions. According to the invention, the received signals are combined in a polarization insensitive way, by controlling the polarization state of the input beams. In this way, the time difference of the intensity response for the two counter-propagating optical signals can be correlated at the point of detection. A clear lead/lag time can be determined and used to calculate backwards so as to resolve the point along the path at which the disturbance affected the signals. The received signals are matched in a way that eliminates the interference signal intensity variations resulting from polarization conditions and thereby demonstrates the lead/lag time without carry forward errors and complications caused by polarization effects.

Conventional locating techniques use interference to respond to phase variation between counter-propagating signals, e.g., as in GB 1,497,995—Ramsay, U.S. Pat. No. 6,621,947—Tapanes, and others. The idea is to develop and to measure a time difference from optical effects from a physical disturbance, applied simultaneously and at the same point to coextensive beams (especially counter-propagating beams) but are discerned or detected at different times after propagation of two different signals along different paths of potentially unequal length. According to such techniques, the operative effect used is a change in intensity at a summing point where two received beams are interfered against one another. In the absence of a disturbance, the intensity of interfering beams theoretically should be more or less constant due to a stable degree of constructive and destructive phase cancellation, i.e., interference, of the two more or less constant signals.

Figure 1:
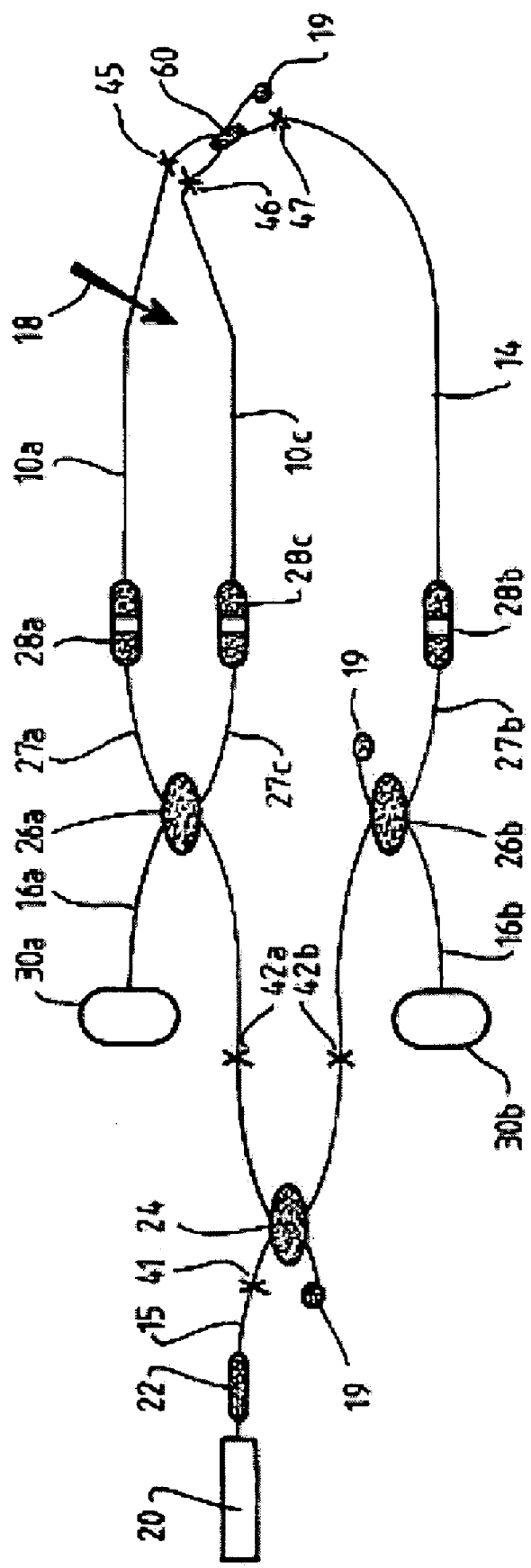
FIG. 1 is a block diagram of a known distributed fiber sensing system in general, for example as known from U.S. Pat. No. 6,621,947—Tapanes, and is labeled as prior art.
Figure 3:
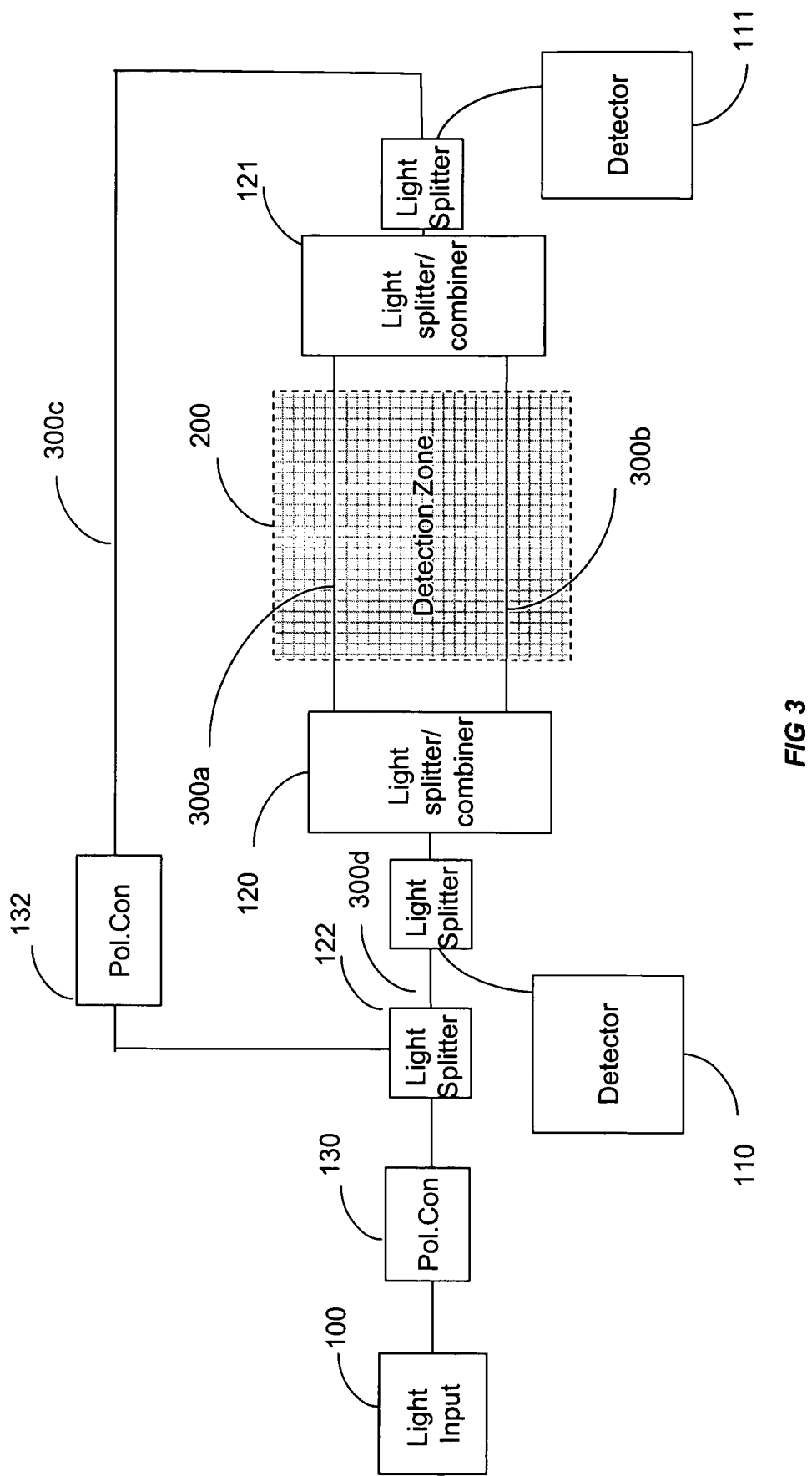
FIG. 3 is a block diagram of alternative embodiment of the invention demonstrating another arrangement of polarization controllers in a distributed fiber sensing system.

An embodiment of known technique, shown in FIG. 1 (which is FIG. 3 in U.S. Pat. No. 6,621,947), has coherent laser light launched into a single mode optical fiber 15, from a pigtailed laser diode light source 20 and a fiber isolator 22. The optical fiber 15 is fusion spliced at 41 to an arm of a single mode fiber optic coupler 24 so light reaching coupler 24 branches into two output arms, each of which is fusion spliced at 42$a$ and 42$b$, respectively, to other single mode fiber couplers 26$a$ and 26$b$. Thus light from the source 20 is launched into both couplers 26$a$ and 26$b$. The two couplers 26$a$ and 26$b$ form launch and detection ports of a dual-ended counter-propagating Mach-Zehnder interferometer. The optical signal is simultaneously launched to the output arms 27$a$, 27$c$ and 27$b$ of the couplers 26$a$ and 26$b$. Only one output arm 27$b$ from coupler 26$b$ is used. All unused arms of couplers are fractured or otherwise provided with terminations 19 that prevent back-reflections. The output arms 27$a$, 27$c$ and 27$b$ of couplers 26$a$ and 26$b$ are terminated at single mode fiber optic bulkhead connectors (through adaptors) 28$a$, 28$c$ and 28$b$. Sensing fibers 10$a$ and 10$c$ are connected to through-adaptors 28$a$ and 28$c$, respectively, such that the light from coupler 26$a$ is simultaneously launched into the fiber link in one direction. A further coupler could be used with arms 10$a$ and 10$c$ to replace using arm 27$c$ and adaptor 28$c$. For the counter-propagating signal, a single mode fiber lead 14 is connected to the through-adaptor 28$b$, such that the light from coupler 26$b$ is launched into the fiber link in the opposite direction. The sensing fibers 10$a$ and 10$c$ are fusion spliced at 45 and 46 to a single mode coupler 60. The fiber lead 14 is fusion spliced at 47 to one arm of the coupler 60 on the opposite side. This forms a transmissive counter-propagating sensing loop configuration. The unused arm of coupler 60 is fractured or provided a terminus 19, avoiding back-reflections.

The counter-propagating signals transmitted through the fiber arrangement propagate along the entire length of the fiber link until they reach the opposite ends and are launched back through bulkhead connectors 28*a*, 28*c* and 28*b* into the couplers 26*a* and 26*b*, respectively, in the opposite direction to the initial launch signals. The signals are each split in the reverse direction through couplers 26*a* and 26*b*. Part of the signals travel back towards the first coupler 24 and laser 20, and the remainder of the signals travel along the arms 16*a* and 16*b* of the latter couplers 26*a* and 26*b*, respectively, which are terminated at photodetectors 30*a* and 30*b*. The fiber isolator 22 reduces the amount of light launched back into the laser diode. The optical signals are simultaneously monitored by the two photodetectors 30*a* and 30*b*. Electronics, signal processing schemes and algorithms process the signals from each detector 30*a* and 30*b*, intending to provide the location 18 of the sensed event by determination of the time delay or difference between the signals affected by the same disturbance.

A disturbance produces a phase variation in both counter-propagating beams, by affecting the optical propagation conditions for both beams. Although this phase variation occurs simultaneously for the two beams at substantially the same point (at the disturbance), the effect on the signals arrives at different times at the detector(s) where the beams are interfered together after propagating over different distances. Theoretically, when a disturbance affects propagation of both beams propagating over unequal path lengths to a detector, a phase variation should arise at the detector on one of the two beams first, after a propagation delay from the point of the disturbance. A difference between the two signals may persist between the time of reception of the first signal to arrive along the shorter path, until the time of reception of the second signal to arrive along the longer path. After the second signal arrives, the same phase variation that affected the first signal affects the second one, theoretically equally.

The present invention is based in part on a realization that the foregoing theory is in practice confounded because of variations in polarization characteristics. Assuming a steady state condition in which two interfering beams produce a given interference amplitude due to an extent of constructive or destructive interference, only the parallel polarization components of the multiple beams can possibly interfere. Orthogonal polarized beams cannot interfere. These and other factors complicate the problem, render the detection/localization technique undependable, and in some situations defeat the possibility of producing an intensity variation by such interference.

The remote disturbance might be any of various physical occurrences that affect the waveguide on a scale that is comparable to the wavelength of the light. Modest instances of changing physical pressure, motion or vibration and the like can change light propagation conditions sufficiently in an optical fiber or similar waveguide, to produce an effect that might be discerned as a disturbance and used as a basis to localize the effect. However, variations in polarization state can be such that the changing propagation conditions do not neatly couple into parallel polarization components that interfere. The undesirable results can include a low amplitude change in the sum of the interfering beams, and differences in the measured time dependent phase values for the two counter propagating signals. The phase varying signals arriving on the shorter and longer propagation paths are not so correlated as to be discernable as the same signal arriving on two paths at different times. The technique fails.

According to an aspect of the present invention, polarization controllers are used to control polarization effects in the counter-propagating optical signals by establishing and maintaining polarization states of the interfering beams for each of the counter-propagating light signals that are amenable to interference of parallel polarization components of the respective beams. This can be accomplished using feedback control so as to cause a polarization controller to seek a maximum peak to peak interference signal amplitude. This and other related polarization management techniques permit a processor coupled to the detector (and optionally coupled to provide the feedback signal to the polarization controller) efficiently, easily and accurately to calculate the location of the disturbance.

Figure 2:
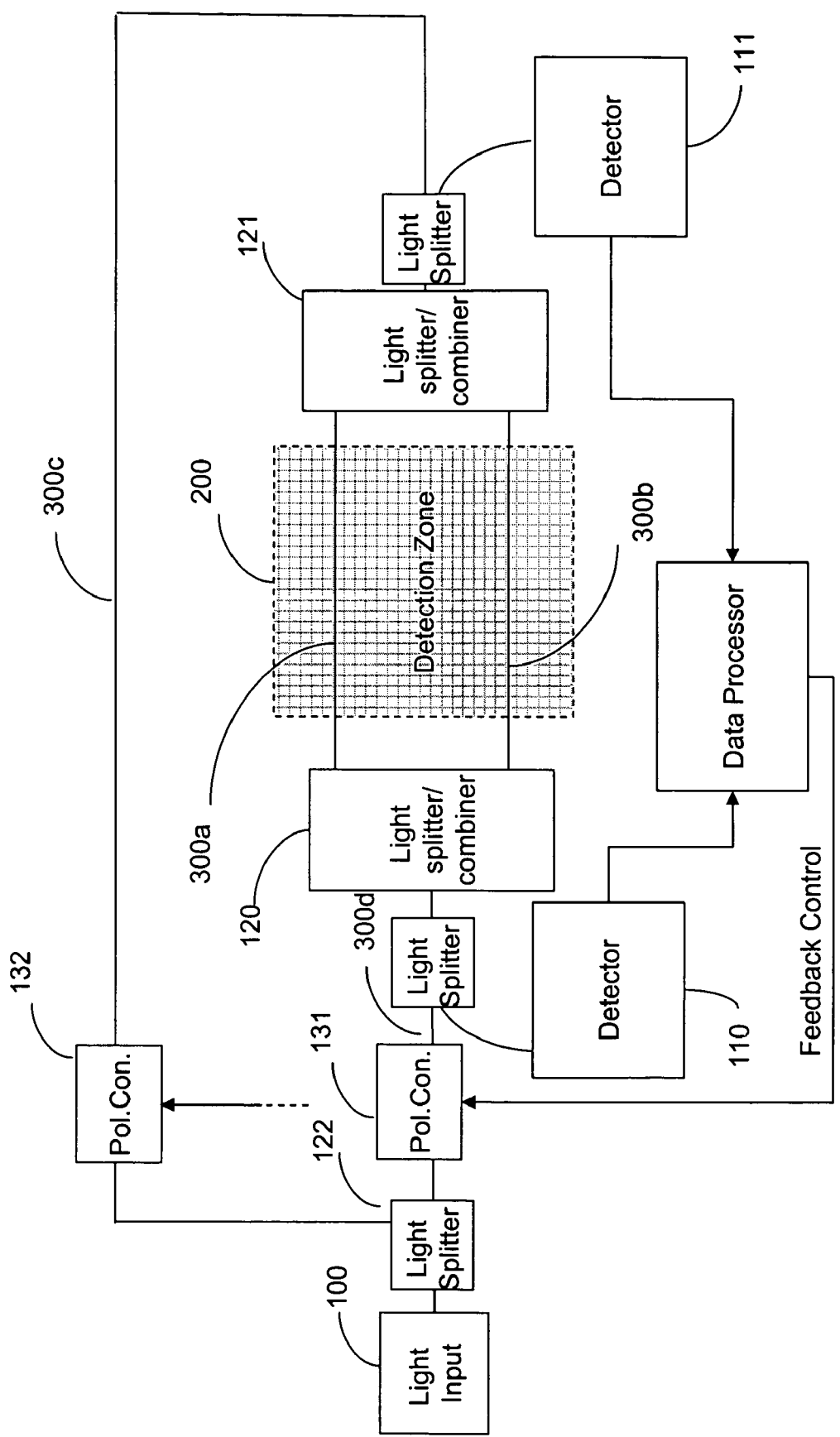
FIG. 2 is a block diagram of distributed fiber sensing system according to an aspect of the present invention, comprising one or more polarization controllers disposed to control polarization aspects of the optical signals.

Referring specifically to FIG. 2, a block diagram shows an inventive polarization controller based distributed sensing system, wherein the object is to determine the location of a physical event causing a disturbance at some point along an optical fiber waveguide passing through a detection zone 200 reliably and accurately. Light from the light sources 100 provides an optical signal for the two counter propagating channels 300*c* and 300*d*. The optical signal is first conditioned using a polarization controller 132 for path 300*c* and 131 for path 300*a*, before being coupled into the input. The signal in each case is separated by a beam splitter 120, 121, thereby forming multiple beams 300*a* and 300*b*. Polarization controller 131 and 132 is adjusted such that the state of polarization of the light beams travel along fiber 300*a* and 300*d* are parallel to each other before they interfere with each other at the beam combiner 120 and 121, for the clockwise and the counter-clockwise propagating light signals, respectively. Each beam propagates along an optical fiber 300*a*, 300*b*. The multiple beams, for each optical channel, pass through the detection zone 200 in opposite directions on different fibers or in different modes of a given fiber. The beams are recombined by beam combiners 121, 120, respectively, i.e., the beam splitter/combiner working in the opposite direction to join two lines to one instead of separating one line into two. The optical signals from the combined optical channels are detected by sensors 110, 111. The sensors extract intensity information for the combined beam after the interference of the multiple beams for each of the two counter propagating light signals after such light signals have propagated through and been affected by conditions in the detection zone 200. The sensors are coupled to a data processing unit that develops feedback control inputs for the polarization controllers 132 and 131 as shown in FIG. 2. The time difference between emergence of a corresponding substantially same phase change for the counter-propagating beams, which can then be resolved to some point along the length of the detection zone.

FIG. 3 is a block diagram that illustrates an alternative arrangement of the polarization controller. Polarization controller 130 is inserted between the light source 100 and light splitter 122, such that it affects both of the counter-propagating light signals. Additional polarization controller 132 is inserted into one of the optical channels, to manage the difference in the principle state of polarization of the fiber interferometer for counter-propagating signals. One additional advantage, as will described later, is that the polarization controller 130 can also be used to adjust the incident state of polarization for both propagating directions, which can be used to balance the polarization transformation for these two optical channels.

Figure 4:
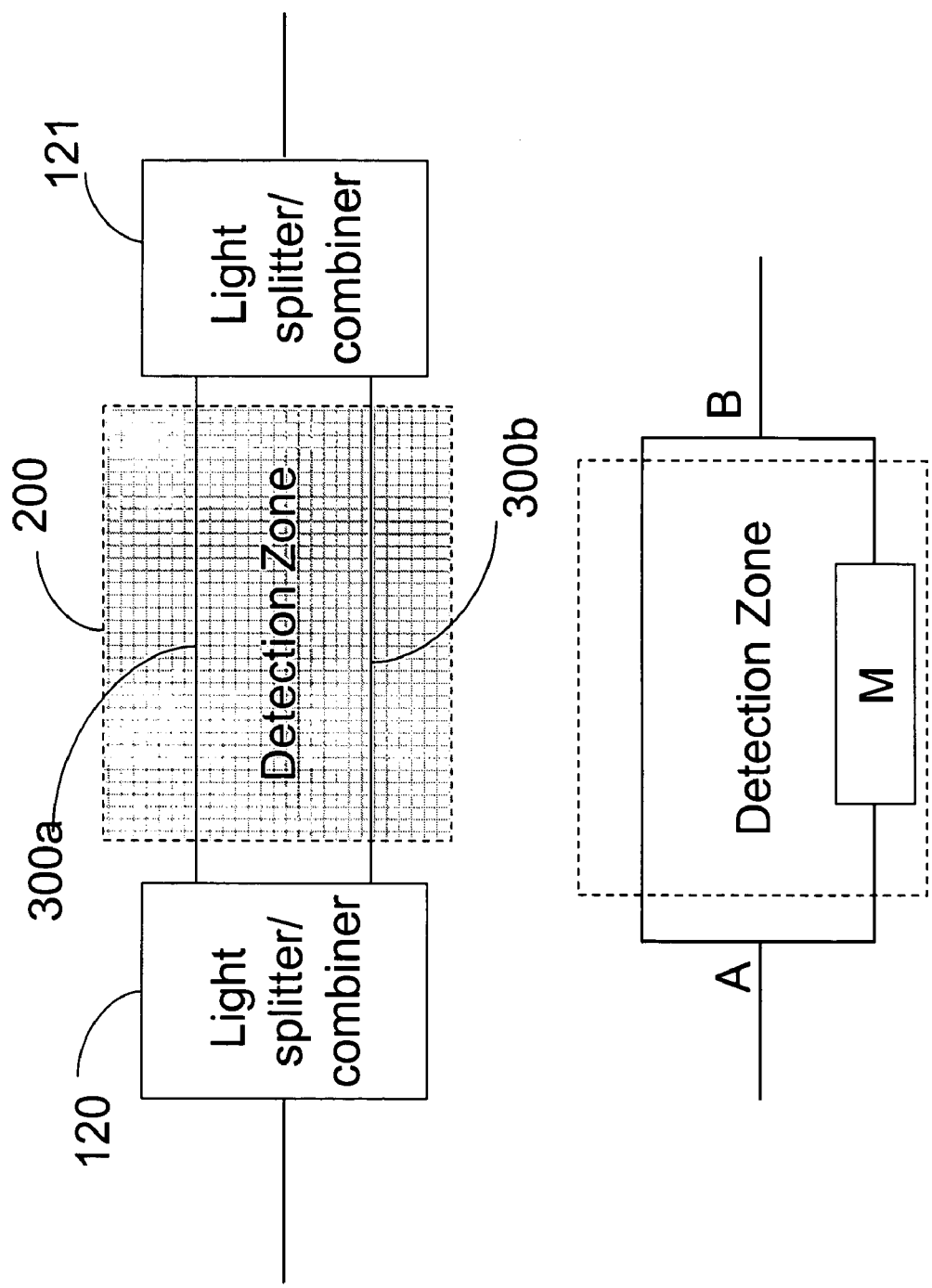
FIG. 4 is a theoretical block model discussed hereinafter in an explanation of polarization effects on the fiber interferometer.

FIG. 4 models the effective birefringent network of the fiber interferometer in the detection zone. As an example, the fiber interferometer comprises two fibers. Each fiber supports a light beam. These two beams are combined by the beam combiner 120 and 121, for the two counter-propagating light signals, respectively.

As shown in FIG. 4, a birefringent interferometer, in which both arms of the interferometer can be birefringent, can be modeled as a birefringent network with an isotropic path and a birefringent path, because as applied to the invention, the relative states of polarization (SOP) between two arms (i.e., the difference) is the parameter of interest, and not the absolute state of polarization. The birefringent path can be represented as a general retarder and can be characterized by a Jones Matrix M.

In order to analyze the polarization effect, the incident light is decomposed mathematically into two orthogonal polarization components, namely components that are parallel and orthogonal to the eigenmode of Matrix M. As shown in FIG. 4, the light injected into the interferometer at point A propagates through the two arms and interferes at point B. The total intensity after interference at point B, can be calculated as follows, $$I_{//} = \frac{1}{2}I_0\cos^2\frac{\theta}{2}\left[1+\cos\left(\phi+\frac{R}{2}\right)\right] \quad (1)$$
$$I_{\perp} = \frac{1}{2}I_0\sin^2\frac{\theta}{2}\left[1+\cos\left(\phi-\frac{R}{2}\right)\right]$$
$$I = I_{//} + I_{\perp}$$
$$= \frac{1}{2}I_0\left[1+\cos\frac{R}{2}\cos\phi - \sin\frac{R}{2}\sin\phi\cos\theta\right]$$

where R is the generalized retardation of M, θ is the angular difference between the incident SOP at point A versus the eigenvector of M on a Poincare Sphere, φ is the phase difference between the two arms.

Equation (1) can be rewritten as follows in a simpler form:

$$I = \frac{1}{2}I_0\left[1+\sqrt{\cos^2\left(\frac{R}{2}\right)+\cos^2\theta\sin^2\left(\frac{R}{2}\right)}\cos(\phi-\gamma)\right] \quad (2)$$
$$= \frac{1}{2}I_0[1+k\cos(\phi-\gamma)]$$

$$\tan\gamma = \tan\frac{R}{2}\cos\theta \quad (3)$$

where γ is the polarization induced phase difference between two arms, and k is the polarization induced visibility change.

In the bidirectional fiber interferometer based security system as described, the location of an intrusion (or some other disturbance or event to be detected), is determined from the phase difference between two counter-propagating signals, and in that respect is as described in the cited prior art. The visibility of the detection signals is important in terms of signal-to-noise ratio and dependability. However, the phase is the crucial parameter containing the measurement information. The phase needs to be balanced and/or compensated in order to enable accurate detection of the location of the intrusion or other disturbance.

In a bidirectional Mach-Zehnder interferometer (MZI), light is launched from both ends of the MZI, and the interference intensity signal is detected at the two detectors 110 and 111 (see FIGS. 2 and 3). The fluctuation of the system over time is reflected in the interference signal, measured from time varying signals at the detectors 110 and 111. In general, as showed above, the two interference intensities depend not only on the intrinsic phase difference of the two arms but also on a polarization dependent phase factor, the value of which changes with the polarization of the light.

Figure 5:
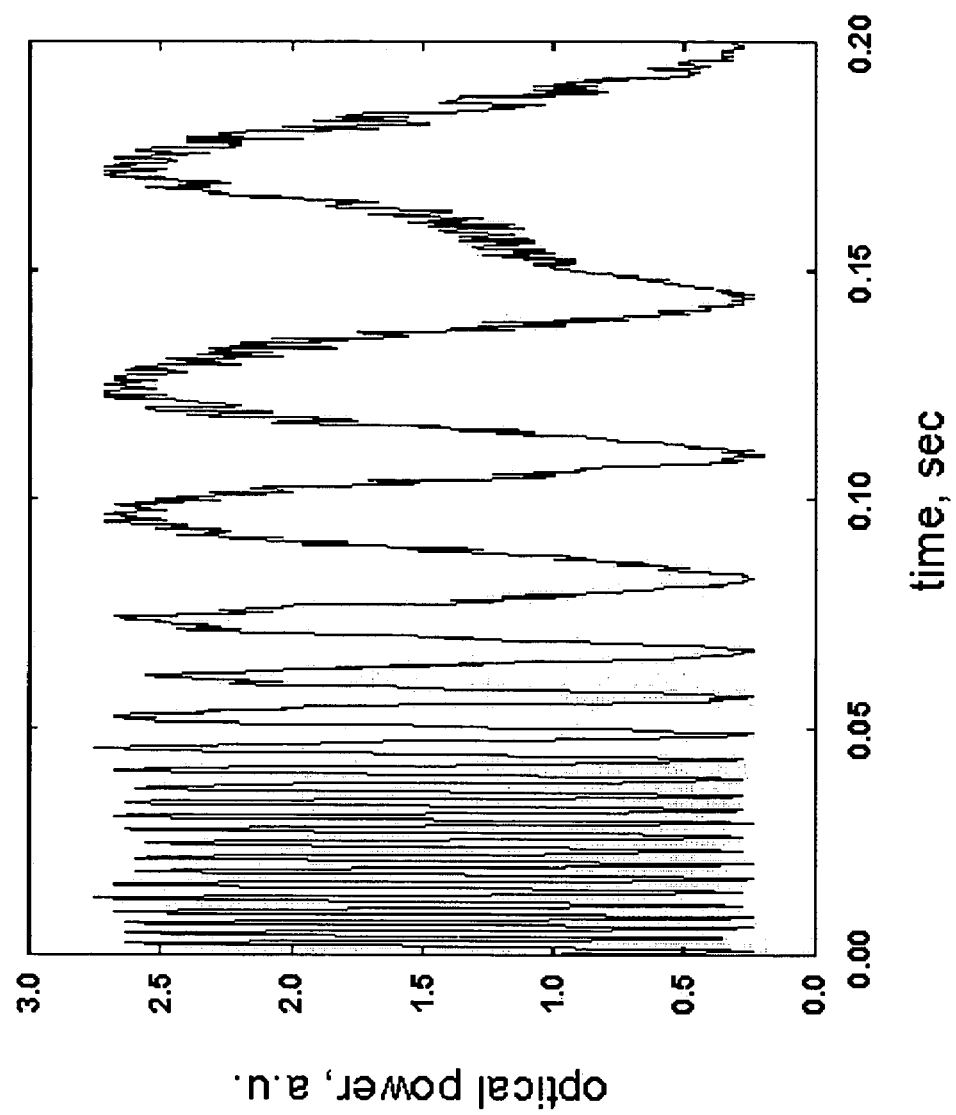
FIG. 5 shows an ideal time plot for an intensity response of a fiber interferometer subject to natural variations (i.e., in the absence of a disturbance).

One reason for using a counter propagating MZI is that for an ideal "balanced" system, in which there are no polarization dependent contributions to the phase, or for cases where such contributions are identical for both the forward and the counter propagating signals, it is possible to resolve the "disturbance" point of the MZI by measuring the time difference in the signal between the forward and the backward propagating waves (with knowledge about the speed of light propagation in the fiber media). In general, however, if the polarization effects are not balanced and/or compensated. The time dependent signal at the two detectors, in practice, will have little or no correlation and will fluctuate substantially independently with time. In that case, the extraction of actual phase difference information is difficult at best. A typical time dependent signal is shown in FIG. 5.

If the two states of polarization are matched, polarization-induced phase effects can be eliminated. As modeled in FIG. 4, the difference between the two arms of the interferometer can be described as a single Jones matrix M. In considering the difference between the two arms in this model, one of the arms is the reference. That arm is not considered to change the SOP at all (in a relative sense), because it is the reference. If the incident SOP is the eigenmode of M, then the two output SOP will be identical to each other. The two outputs will dependably interfere, without polarization-induced phase effects.

Figure 6:
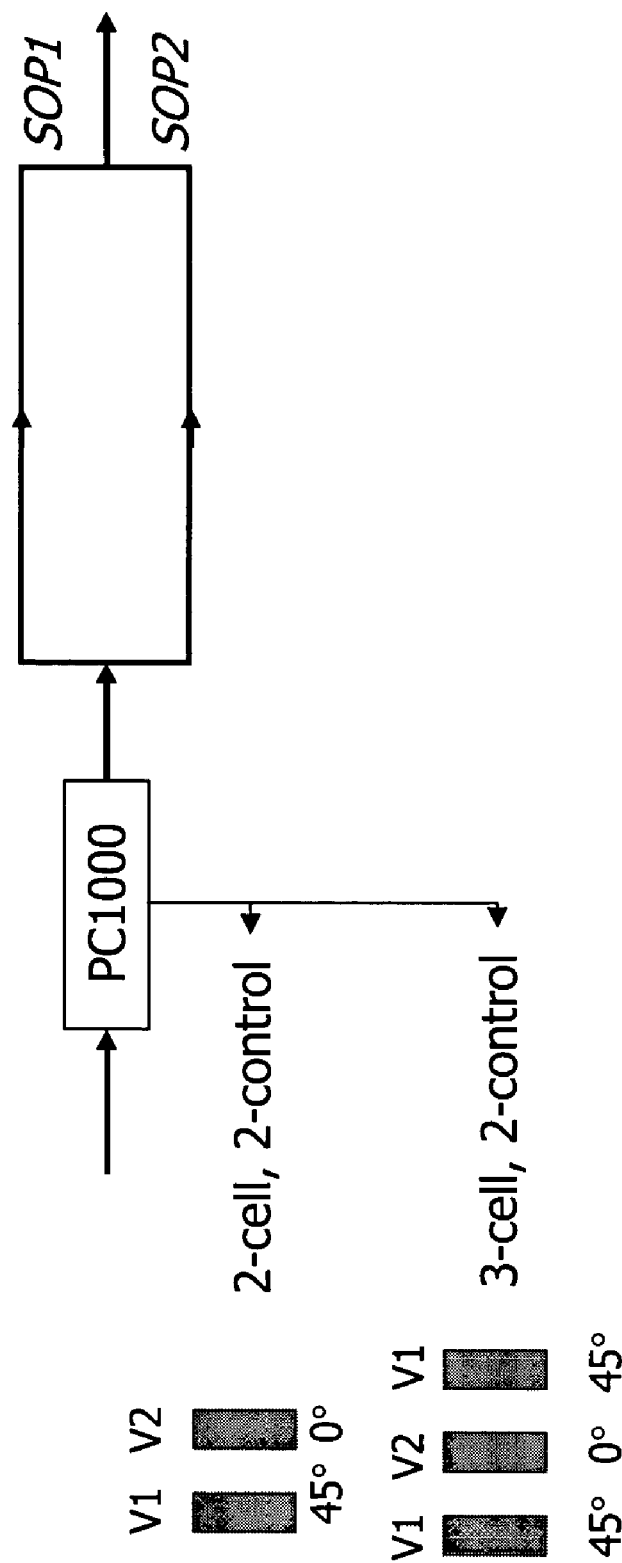
FIG. 6 is a schematic block diagram for illustrating the effects of application of the inventive polarization controller on the response of the fiber interferometer.

There are alternative configurations possible to match these two SOP as described. Two configurations including polarization controllers are shown in FIG. 6 as examples, namely a two-cell polarization controller and a three-cell polarization controller. A three-cell polarization controller can reach all possible arbitrary states of polarization. A two-cell polarization controller is more limited, and depending on the incident SOP, there may be certain zones on the Poincare Sphere that the controller cannot reach from that incident SOP. As a result, a configuration with a two cell polarization controller may not be capable of effective polarization matching in the interferometer in certain situations, leading to detection system failure. An arbitrary polarization controller is preferred in order to match the SOP for the two arms for an arbitrary system, providing sufficient degrees of freedom to allow any arbitrary input polarization to be transformed to any other arbitrary polarization. A limited (two-cell) controller is possible, however, in a case where occasional inability to detect and/or localize a disturbance is not critical or can be prevented by other measures as described herein.

Figure 7:
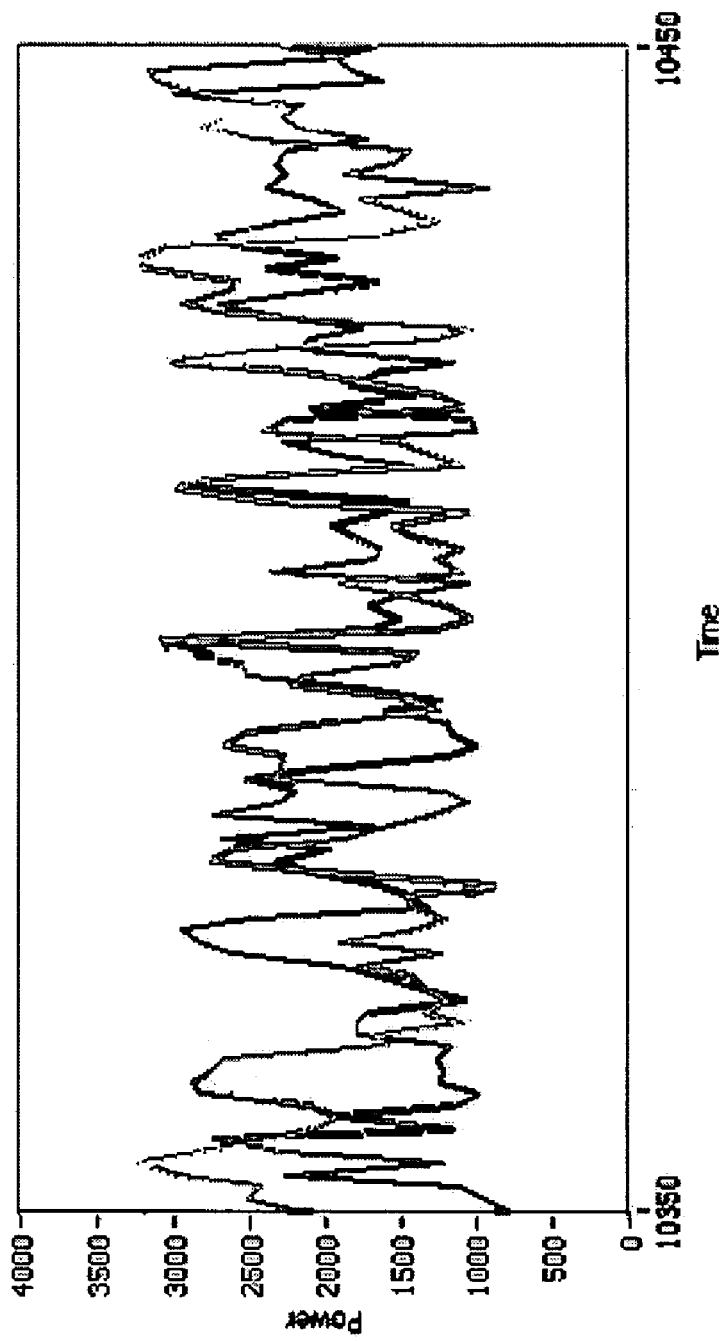
FIG. 7 shows a pair time plots to be interfered, as counter-propagating signal intensity responses of a fiber interferometer, one for each of the counter-propagating beams, but wherein the polarization is not matched. The two plots do not correlate well.

FIG. 7 shows a superimposed pair of time plots to be interfered, as counter-propagating signal intensity responses of a fiber interferometer, one for each of the counter-propagating beams, but wherein polarization has not been matched. As illustrated in FIG. 7, the two plots do not correlate well. The correlation may be insufficient to enable identification of the signature of a given disturbance in both responses, which obviously is required to produce a measurement of the lead/lag time between such signatures.

Because of polarization dependent effects such as signal fading and phase shift, the intensity responses of the interference for the counter-propagating signals may not be subject to correlation, or correlation may be difficult, or attempts at correlation may result in errors. As a result, the time difference cannot be accurately determined.

Figure 8:
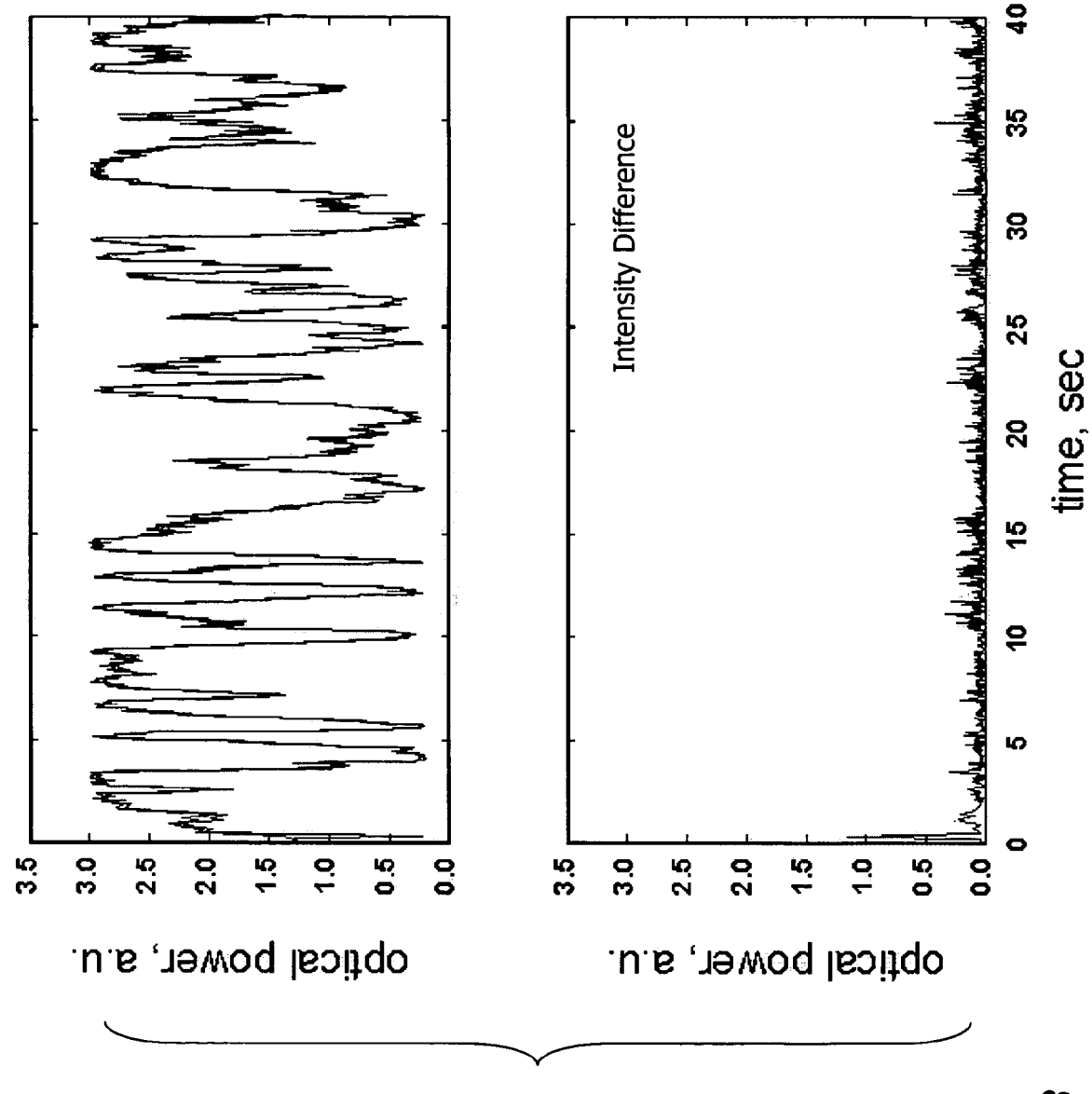
FIG. 8 is the time plot of fiber responses (upper plot) and the corresponding difference in the responses (lower plot), one for each of the counter-propagating beams, when the polarization of the counter-propagating signals are properly managed.

By comparison, FIG. 8 is the time plot of two fiber responses (in the upper plot) and the corresponding time plot of the difference between the responses (lower plot), one the two counter-propagating beams, wherein the polarization of the counter-propagating signals are managed as discussed herein.

In the cited prior art, the location of the intrusion is determined from the difference in the time of arrival at the detectors of the effects of the intrusion, in the two counter-propagating beams, which is a phase difference between corresponding signal patterns. Visibility problems are distinct from timing effects and do not displace signals in time. However, polarization-induced phase shift inherently varies timing. Thus, accurate operation of a disturbance location and detection system can depend on proper compensation of polarization.

There are two methods for dealing with polarization effects when comparing the phase of two counter-propagating beams:

(a) to make γ=0, or
(b) to make the two γ have a fixed or known relation (for example, to make them nonzero but equal).

For a non-birefringent system, R=0, therefore we have γ=0.

In order to eliminate polarization effects, one or more polarization controllers should be included, examples being shown in FIG. 2 and FIG. 3. There are a number of alternative ways to configure and operate the polarization controllers. Several such examples will be illustrated as non-limiting examples.

One polarization control method is Depolarization, which can be achieved using polarization scrambling. The concept is substantially completely to depolarize the light. The intensity along the two orthogonal eigenvectors is then the same. If the intensities are always equal, such scrambled polarization is equivalent to θ=π/2. According to equation (3), θ=π/2 will yield γ=0. Therefore, the intensity after interference can be expressed as follows:

$$I = \frac{1}{2}I_0\left[1 + \cos\frac{R}{2}\cos\phi\right]$$

Although visibility depends on effective retardation in this case, the phase is polarization independent. However, in order to achieve the desired result, a substantially complete depolarized light signal is required. Incomplete scrambling (i.e., scrambling but leaving some degree of polarization) may reduce polarization dependence, but unless the light is completely depolarized, interference will remain polarization dependent. In order to operate effectively, it is necessary substantially completely to depolarize the light, to scramble at a rate that is faster than the frequency of the signal produced by the disturbance, and to make the polarization scrambling not only fast, but also uniform.

Another polarization control method is Polarization-Induced Phase Compensation by Phase Matching. This method comprises making γ identical for both propagating directions. Matching the phase of intensity fluctuations in both propagating directions is one way to achieve this.

As shown in equation (2), $$I = \frac{1}{2}I_0[1 + k\cos(\phi - \gamma)].$$

If the phases of the two intensity response are identical, then $\gamma_{forward} = \gamma_{backward}$ because $\phi_{forward} - \gamma_{forward} = \phi_{backward} - \gamma_{backward}$ and $\phi_{forward} = \phi_{backward}$.

The intensity fluctuation can be caused, for example by slow temperature fluctuation, which in turn causes the phase (φ) and polarization (k and γ) to fluctuate. By adjusting one of the polarization controllers 131 or 132, the fluctuation of these two signals can be synchronized and caused to have the same phase.

A further technique is Polarization-Induced Phase Compensation By Minimizing/Maximizing Intensity: As shown in equation (1), when the intensity of the signal after interference is at its global maximum or minimum, the two SOP must be either parallel or orthogonal to each other. This information can be used to eliminate or compensate for polarization-induced effects by controlling the polarization so as to seek the greatest possible peak-to-peak swing in the interference signal. The relation between SOP1 and SOP2 can be adjusted using one or more polarization controllers.

By rewriting equation (1), we have:

$$I = I_{//} + I_{\perp} = \frac{1}{2}I_0\left[1 + \sqrt{\cos^2\left(\frac{R}{2}\right) + \cos^2\theta\sin^2\left(\frac{R}{2}\right)}\cos(\phi - \gamma)\right]$$

$$= \frac{1}{2}I_0\left[1 + \cos\left(\frac{R}{2}\right)\cos\phi - \cos\theta\sin\left(\frac{R}{2}\right)\sin\phi\right]$$

$$\theta = 0, \pi, I = \frac{1}{2}I_0\left[1 + \cos\left(\frac{R}{2} \pm \phi\right)\right].$$

This shows that the intensity is maximum or minimum when the cosine term is −1 or +1 when θ=0 or θ=π, corresponding to aligned or orthogonal polarization alignments. The global maximum and minimum is the total intensity and the zero intensity corresponding to maximum and minimum constructive and destructive interference. When the global maximum and minimum is achieved (i.e. the visibility is maximum), the polarization is aligned. However, practically this method can only be achieved by allowing the phase change to vary by a full cycle at the right polarization (i.e., it is necessary to realize the full extent of global variation before one can seek to control to a maximum and minimum level thereof). This can be difficult or time-consuming in stable or slow-varying systems.

For a system that fluctuates slowly, a comparable effect can be achieved by setting the intensity value to its local maximum or minimum inside a data window. Assuming R and φ do not change during a period of time, then θ can be adjusted to 0 or π by setting the intensity response to its local maximum or minimum. As shown in the above equations, one disadvantage of these methods is that due to the fluctuation of R and φ, the target could be maximum or minimum. This ambiguity may complicate the control algorithm.

Yet another technique is Polarization-Induced Phase Compensation By Alternative Polarization Scrambling. The foregoing ambiguity between minimum and maximum targets can be solved by using polarization scrambling as a technique to exercise the system. Because R and φ are identical for the two propagating directions, scrambling the polarization of one channel will allow the system to realize the range of the other channel.

A typical procedure for this technique comprises:

Scrambling the SOP for one of the channels, e.g., channel A, thereby obtaining a maximum and a minimum signal level;

Comparing the max/min signal levels of one of the channels (channel A) to the max/min of the other (channel B), and choosing one channel or the other to use for seeking the greatest available peak-to-peak span;

Adjusting the SOP of said other channel (channel B), to seek the maximum or minimum; and, Repeating such scrambling, comparing and adjusting steps for the other channel.

The foregoing technique of alternating the channels to exercise and adjust causes the polarization states of both channels to be moved to an optimum for the current conditions of the optical transmission system. This control can be effected in an ongoing manner or periodically or after detecting a disturbance, etc.

Polarization-Induced Phase Compensation By Polarization Dithering is another method that can be used to eliminate the polarization-induced effects. In the intensity relationship, $$I = \frac{1}{2}I_0\left[1 + \cos\frac{R}{2}\cos\phi - \sin\frac{R}{2}\sin\phi\cos\theta\right].$$
$$\frac{dI}{d\theta} = \sin\frac{R}{2}\sin\phi\sin\theta$$

As shown in the foregoing equation, if a driving voltage to the polarization controller (hence the SOP) is changed at a fixed frequency $\omega$, the response of the intensity at frequency co will be zero if the polarization is parallel or orthogonal to the eigenmode of the effective birefringence network: $\theta=0$, $\pi$. This aspect opens another control opportunity.

In order to eliminate the polarization dependent phase factor $\gamma$ discussed above, polarization controllers can be configured, for example as shown in FIG. 3. Then, by adjusting the control values applied to the polarization controllers 131 and 132 so as to make the time dependent variation of the two detector signals match, the polarization dependent phase factors may be compensated.

Some control solutions are more suited to a given detection system than others. The selection of a polarization control technique, including the parameters by which the controller is adjusted in the control scheme, the location of the polarization controllers in the optical path, as well as considerations such as responsiveness, expense and similar factors can be applied to optimize and configure a detection system.

In one embodiment, the control values applied to the polarization controller can be changed to maximize visibility, by seeking a control point that maximizes the difference between the maximum and the minimum levels of the detector signal (such as at detector 110) while varying the control input to the polarization controller 132. Subsequently, the signal at the second detector (detector 111 in this case) is controlled by adjusting polarization controller 131 such that the signals are in sync. This approach relies on the expected intrinsic instability of the usual detection system. However, the necessary instability may or may not be available (or available when needed), and is not deterministically controllable. Thus, such an ad hoc approach is not guaranteed. Where intrinsic phase fluctuations are necessary for synchronizing the two signals and to maximize visibility, and such fluctuations happen to be slow, the initial locking period can be overly long. Other methods may be advantageous, alternatively or in addition (e.g., to be deployed upon startup or when a need arises) that can allow faster locking of the signals. Additional advantages are also possible, as discussed in greater detail below.

In a particularly advantageous embodiment, a polarization controller 130 is disposed immediately after the laser source so that the light injected from both ends of the detection zone is changed exactly in the same manner, as shown in FIG. 4. In this configuration, there is no need to rely on the intrinsic instability of the system, and the desired fluctuation of the system can be controlled by varying control inputs to the polarization controller 130, because the phase relationship between the two paths can be adjusted by changing their polarization relationship.

This polarization controller 130 also can be used for checking whether a proper lock of the overall system has been achieved. The general idea is to adjust the system in such a way that the relative polarization transformation (the relationship of the output to the input) is the same for the two counter-propagating channels. If the polarization effects are or can be made to be identical, they will not affect the determination of the location of the intrusion or other disturbance.

As shown in equation (2), the phase of the intensity response after the interference contains two terms: the difference in the absolute phase for the two interference arms, and the difference in the polarization-induced phase for the two interference arms.

In order to balance the polarization-induced phase, raw data for the two propagating directions can be used. According to equation (2), when the phases of the fluctuations of the two intensities are matched, the two paths are balanced. However, this balance does not equate with a balance in the polarization transformation functions. Previously matched signals may become mismatched by scrambling of the incident state of polarization (SOP). In order to balance the polarization transformation functions, the two intensities need to be matched for substantially all incident SOP.

Figure 9A:
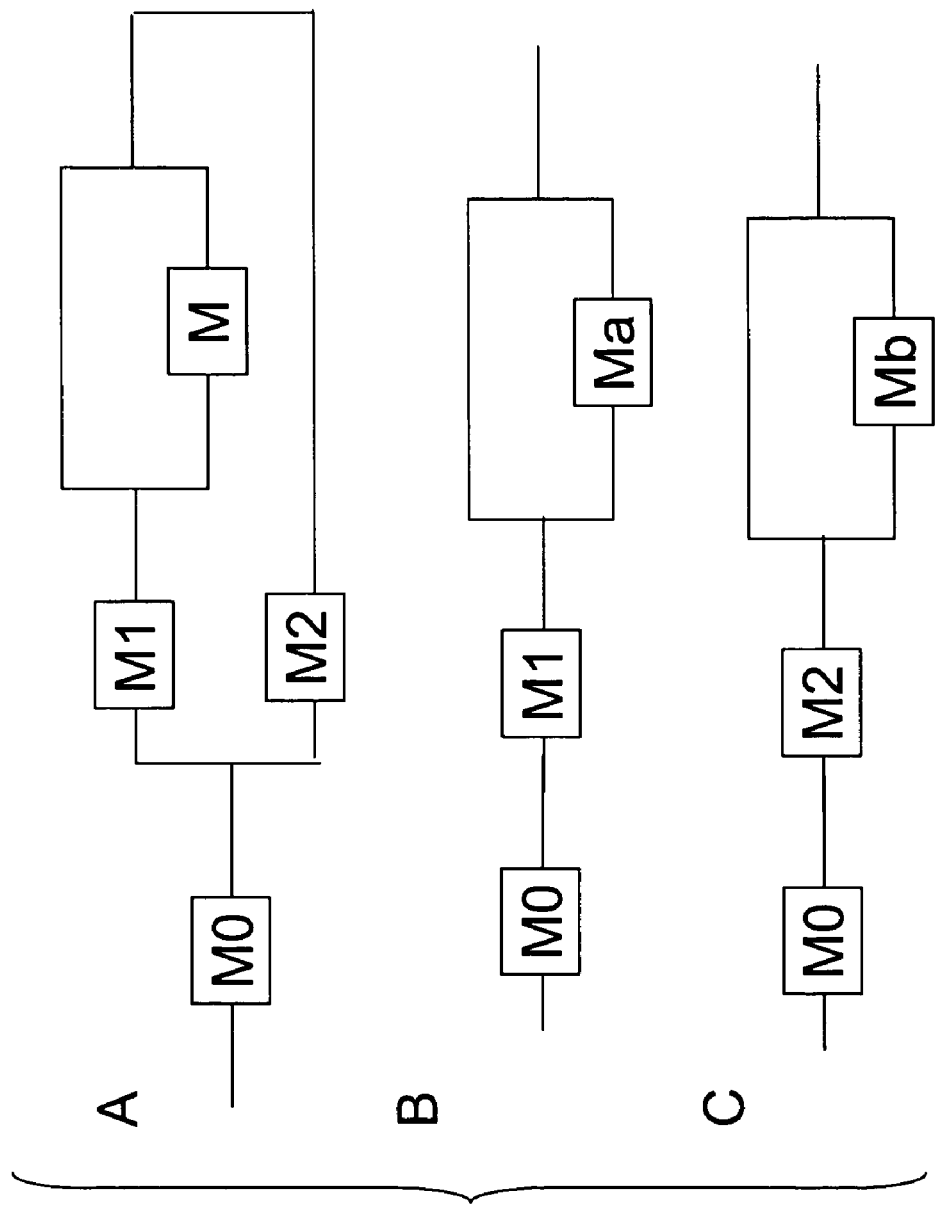
FIG. 9($a$–$d$) demonstrate variations in effective birefringence networks for the fiber based distributed remote sensing system of the invention, particularly using a master polarization controller.

A bidirectional interferometer can be modeled as two birefringence networks, one for each propagating direction. The difference in these two networks is summarized in the Jones Matrix (or Muller Matrix). Ma and Mb are the effective general retarder matrices, shown in block diagram form in FIG. 9a. Ma is for forward propagation and Mb is for backward propagation. M1 and M2 represent the respective fiber link retarder matrices, for forward and backward propagating beams, from the coupler to the interferometer. The system after the interferometer does not affect intensity, and therefore is omitted in this analysis.

Figure 9B:
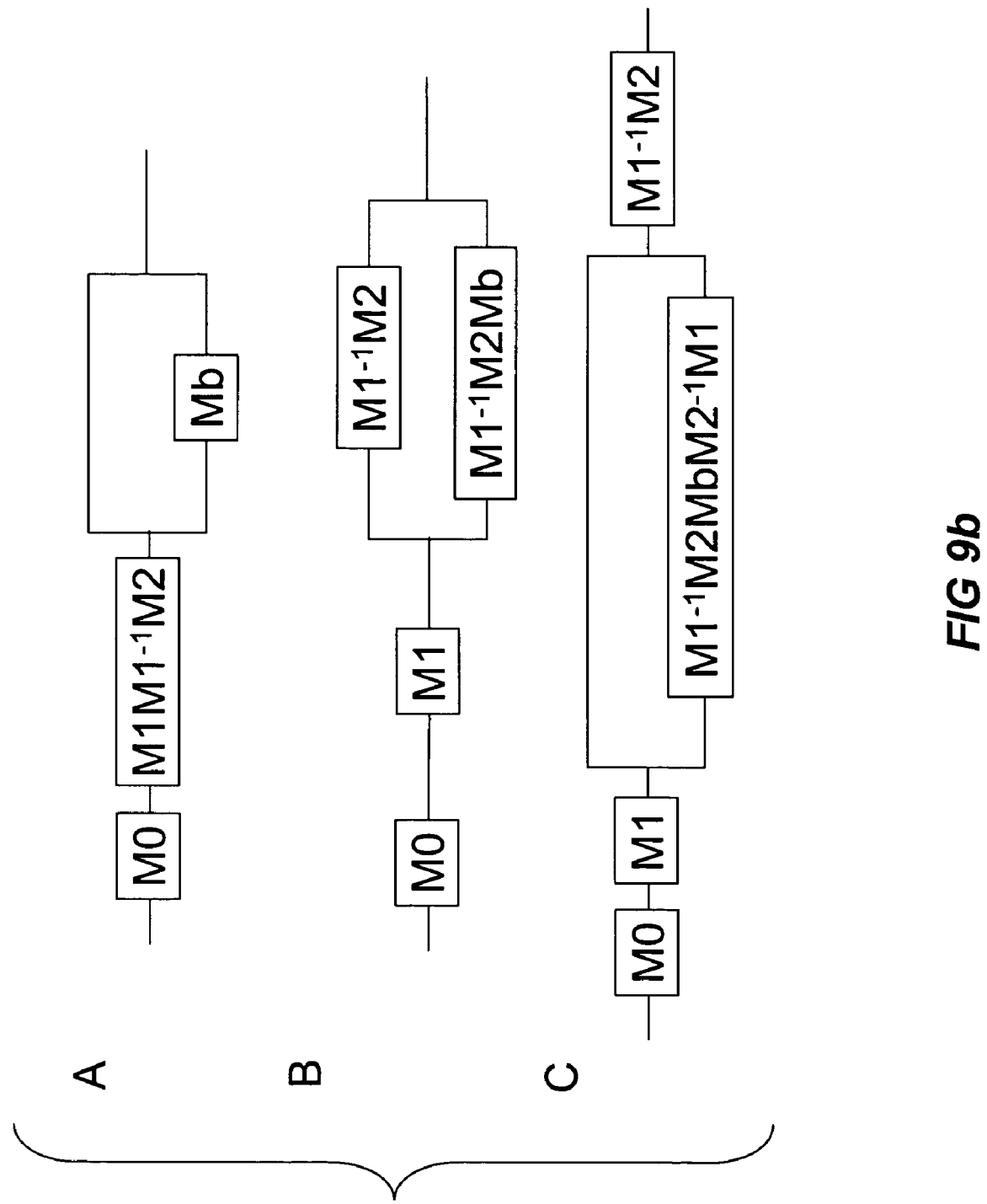

FIG. 9b shows the effective birefringence network for the backward propagating channel. Because the relative relationship between the SOP is important for the interference effect (and not an absolute SOP), we can rearrange the Jones matrix as shown in FIG. 9b, such that the polarization effects before the interferometer are identical for these two channels. In order to get the same intensity response, $M_1$ and $M_2$ need to satisfy the following relations:

$$M_1^{-1}M_2M_bM_2^{-1}M_1=M_a \quad (4)$$

Figure 9C:
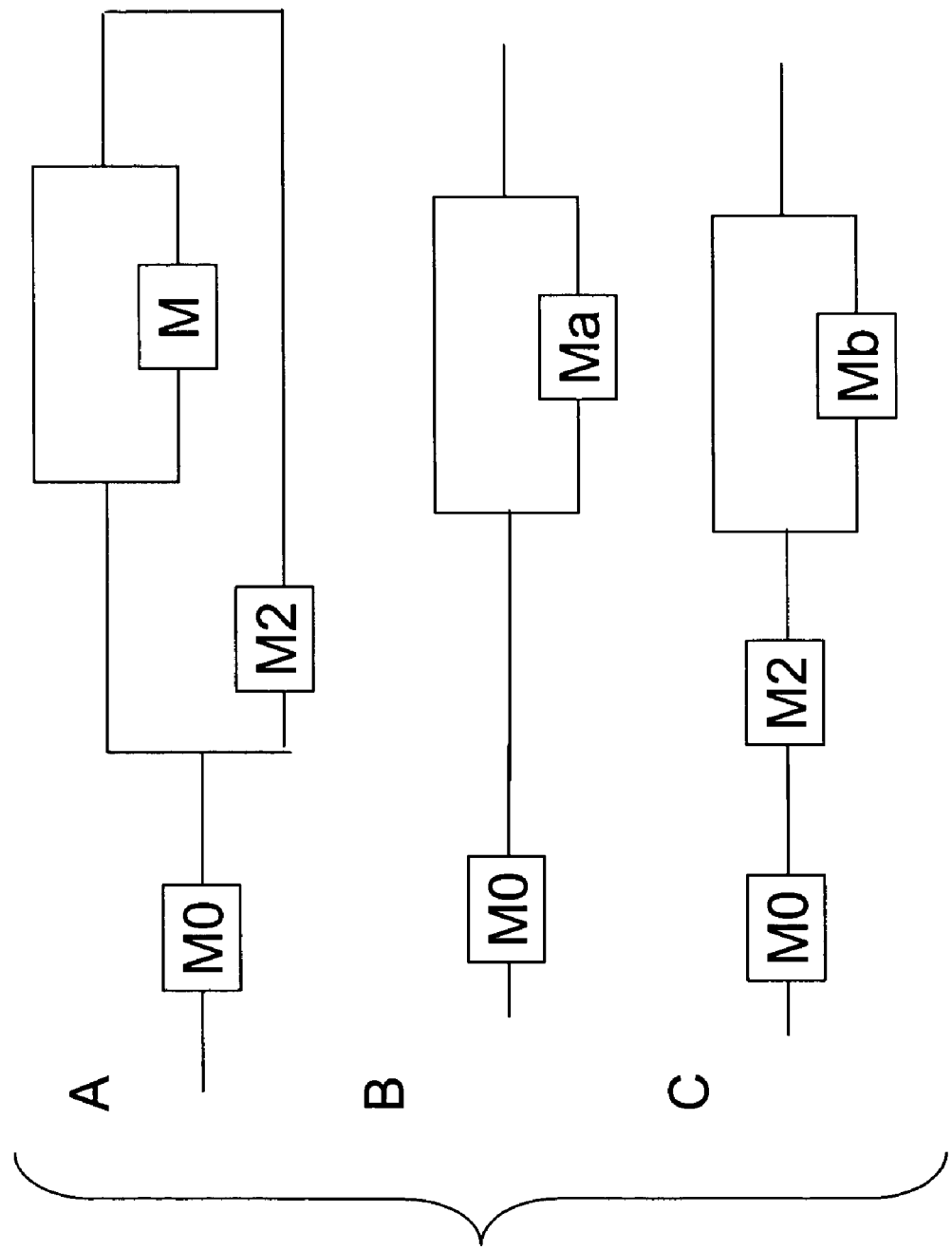
Figure 9D:
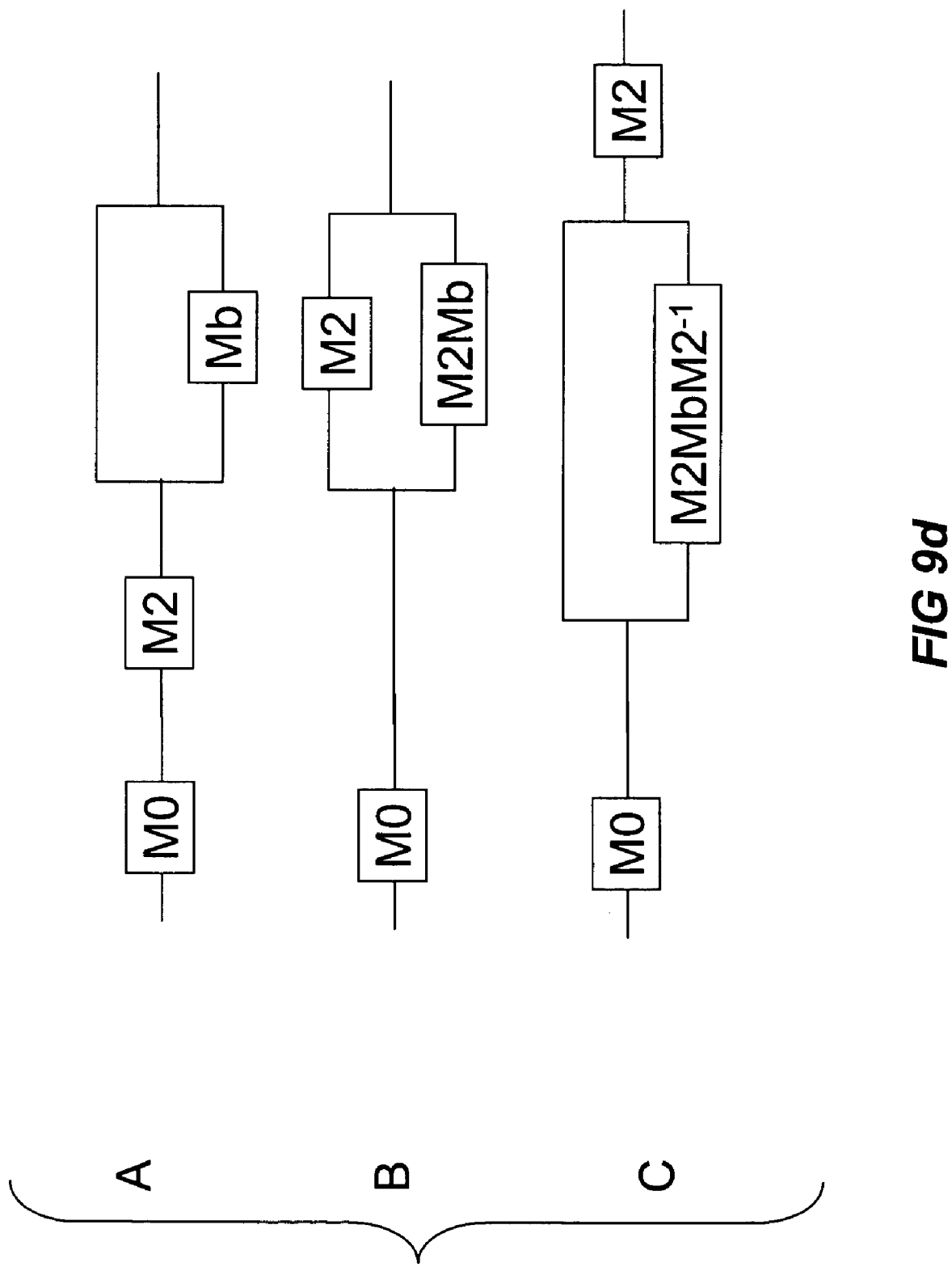

If we assume $M_1^{-1}M_2=M_3$, equation (4) can be rewritten as $M_3M_b M_3^{-1}=M_a$, which suggests that one polarization controller will be sufficient to balance the polarization transformation function for the two propagating channels, as shown in FIG. 3 and FIG. 9c. The effective birefringence network and its balance are shown in FIG. 9d. Assuming $M_1=1$, we have $$M_2 M_b M_2^{-1} = M_a. \quad (5)$$

In actual systems, it is advantageous to use two-polarization controllers, so that the two polarizations can be matched without having to reset the control input values of a given polarization controller. Using an over-parameterized control (i.e., more than sufficient or redundant polarization state control capabilities), the matching can continue in an "endless" manner, without the need to reset, for example, when successive incremental changes reach the end of the available control span of a single polarization controller.

In order to balance the polarization transformation, the polarization controllers need to be adjusted such that equation (4) or (5) are satisfied. An example of how to balance the polarization transformation functions can be appreciated with respect to FIG. 3. FIG. 3 shows a bidirectional fiber based interferometer with two polarization controllers, one controller 132 is coupled to the counter-clockwise propagation channel and the other controller 130 is disposed between the laser source and the coupler. Balancing of the polarization transformation functions is achieved using active polarization control. The polarization controller 132 is adjusted constantly (repetitively) to maintain the phase match of the two intensities, while the polarization controller 130 is scrambling. Similarly one may use the 'endless' approach discussed above in which both the controllers are used to synch the two intensity signals in presence of the randomly varying values applied to controller 130.

Polarization scrambling via controller 130 serves two purposes. It speeds up homing in on the desired phase match, and also "truly" balances the polarization effects.

One possible approach is to use the phase match of raw data to compensate for polarization-induced phase effects. Such approaches have drawbacks. They are generally slow. The polarization effects are not truly balanced, and instead are balanced only for a particular launch state. As such, the system may be susceptible to drifting with relatively changes in conditions.

Such previous approaches (without using a polarization controller 130 or the like) may depend on slow fluctuations of the system as the exercising influence that permits matching of the phase of the intensities during fluctuation. This could be very slow. For example, actual system fluctuations in many practical installations are likely to be due primarily to slowly changing physical parameters such as time-of-day temperature fluctuations.

Although the intensity fluctuations match if the polarization transformations are balanced, the opposite may not be true. A match of intensities for a particular incident SOP, does not ensure that the balance of polarization transformations will apply at other incident SOP.

In a practical system, not only does the phase fluctuate, the birefringence also changes with time due to environmental fluctuations. Although phase fluctuation will not cause any problem because it is balanced between the two propagating directions, the birefringence certainly changes the balance and requires attention to maintaining or tuning the system. As shown in equations (4) and (5), the birefringence fluctuation will change the Matrix Ma and Mb, such that these two relations will not hold.

One solution is constantly and repetitively to match the polarization effects. However, this is not possible if the phase fluctuation is used to balance the polarization effects.

The use of an additional polarization controller before the coupler introduces a potentially fast change into the system. In order to separate the polarization scrambling and the potential intrusion, the polarization can be scrambled at a relatively lower frequency (e.g., 10 to 100 HZ) compared to the frequency response of the typical intrusion (e.g. at least 1 KHz). This ensures a true polarization lock due to time dependent birefringence changes in the optical system. An additional advantage of locking with polarization scrambling is that the visibility is kept large and generally close to its maximum.

Balancing of the polarization transformations can comprises balancing at a limited set of specific input SOPs, instead of scrambling through a wide or randomized variety. For example, if the polarization response of both systems is found to be identical for four linearly independent input SOP, then the polarization transfer function for these two systems can be considered identical based on those four test states.

Figure 10:
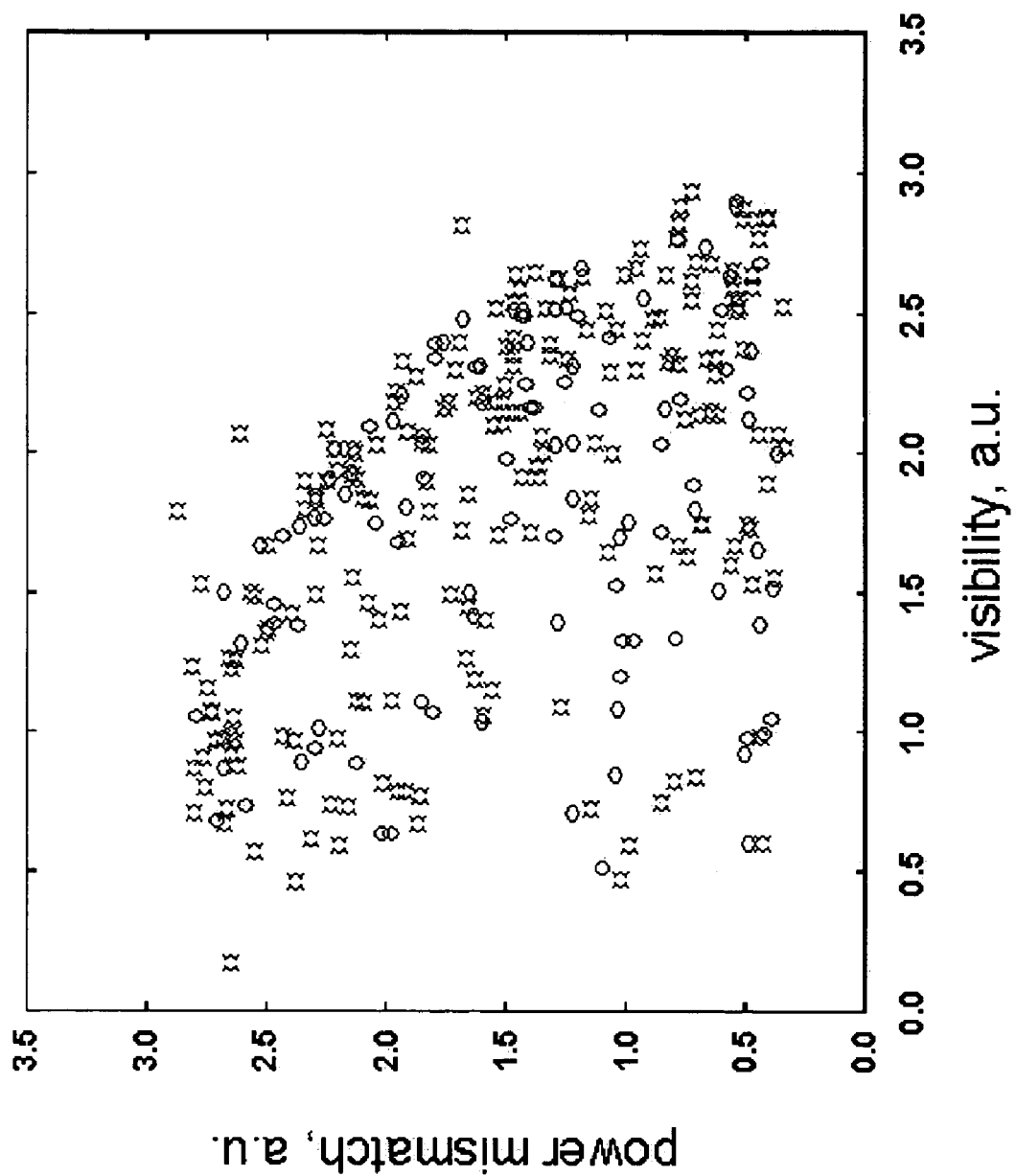
FIG. 10. Relation of visibility and intensity matching. The higher the visibility, the better the intensity matching.

Maximum visibility indicates the polarization of the two arms of the interferometer is matched. FIG. 10 illustrates the relation of the locking results and the visibility. Higher visibility will yield much better locking.

The patents and publications noted in the background and the detailed description are available and their teachings and further citations are to be deemed to be incorporated into t his disclosure by reference. The invention having been disclosed and illustrated by examples, various modifications and variations can be seen as possible in light of the above teachings. It should be understood that the invention is not limited to the embodiments specifically used as examples, and reference should be made to the appended claims to assess the scope of the invention in which exclusive rights are claimed.

We claim:

1. An apparatus for detecting and locating disturbances, comprising:

at least one light source;

an optical system with at least one optical waveguide, the optical waveguide having at least one detection zone at which a disturbance can occur and affect optical signals from the light source when traveling through the waveguide, in the detection zone, along counter-propagating optical channels;

at least one beam separator between the light source and the optical system, wherein the beam separator couples at least two beams into the optical waveguide for each of the at least two counter-propagating optical channels;

at least one polarization controller operable to manage optical properties of said counter-propagating optical channels, the polarization controller adjusting optical properties for at least one of the optical signals when propagating toward the detection zone;

at least one detector coupled to the optical waveguide and responsive to the optical signals after traversing the detection zone;

a data processing unit coupled to the detector, the data processing unit being operable to localize a place of the disturbance in the detection zone from a difference between times at which effects of the disturbance appear at the detector; and, a feedback control coupled to the optical system and to at least one said polarization controller, wherein the feedback control and the polarization controller are configured to maximize a signal-to-noise ratio and to minimize a polarization contribution to said difference between times, by at least one of: seeking a predetermined relationship between polarization phase transformations along the counter-propagating optical channels, maximizing a peak swing in intensity at a point of interference of the beams, and varying an input state of polarization for one of testing and adjusting a balance between said polarization transformations for the counter-propagating channels.

2. The apparatus of claim 1, wherein the light source comprises a laser.

3. The apparatus of claim 1, wherein the light source is wavelength tunable.

4. The apparatus of claim 1, wherein the light source comprises a single beam source coupled to the at least one beam separator, wherein the beam separator couples a portion of light energy from the single beam source separately into each of the counter-propagating optical channels, respectively.

5. The apparatus of claim 1, wherein the light source comprises at least two beam sources that are coupled respectively to said counter-propagating channels.

6. The apparatus of claim 1, wherein the optical waveguide comprises at least one optical fiber in the detection zone, and the counter-propagating beams are passed through said at least one optical fiber in the detection zone.

7. The apparatus of claim 6, wherein the at least one optical fiber in the detection zone comprises a single mode optical fiber.

8. The apparatus of claim 1, wherein the optical waveguide comprises at least two optical fibers that are coextensive at least in the detection zone, and wherein both of said at least two optical fibers are subject to the disturbance in the detection zone.

9. The apparatus of claim 1, wherein optical waveguide comprises at least one optical fiber extending along the detection zone, and wherein said optical fiber is at least one of configured and controlled such that the optical properties are substantially the same for said counter propagating channels with respect to optical phase.

10. The apparatus of claim 1, wherein optical waveguide comprises at least two optical fibers, at least one of which extends along the detection zone, and wherein said two optical fibers are at least one of configured and controlled such that the optical properties are substantially the same for the said counter propagating channels with respect to optical phase.

11. The apparatus of claim 1, wherein said at least one polarization controller is placed between said light source and at least one of the counter-propagating optical channels.

12. The apparatus of claim 1, wherein the said optical waveguide is coupled to define at least one path in an interferometer.

13. The apparatus of claim 12, wherein the said interferometer is configures as a Mach-Zehnder interferometer.

14. The apparatus of claim 1, wherein said beam separator is polarization insensitive.

15. The apparatus of claim 1, wherein said beam separator is polarization sensitive.

16. The apparatus of claim 1, wherein the polarization controller is operable to transform the optical properties of at least one beam of the counter propagating optical channels from a first arbitrary state of polarization to a second arbitrary state of polarization.

17. The apparatus of claim 1, wherein said at least one optical detector is operable to sense at least one aspect of a light signal from said counter propagating channels.

18. The apparatus of claim 17, wherein said optical detector is operable to sense an intensity aspect of the light signal.

19. The apparatus of claim 1, wherein said at least one optical detector is operable individually to sense at least one aspect of light signals emerging respectively from said counter propagating channels.

20. The apparatus of claim 1, wherein the feedback control to the polarization controller is configured to maintain a signal to noise ratio for a signal resulting from the disturbance.

21. The apparatus of claim 1, wherein the feedback control and the polarization controller are configured to minimize at least one of polarization induced signal fading and polarization induced phase shift.

22. The apparatus of claim 21, wherein the polarization controller is configured at least in one mode substantially to scramble a polarization state of at least one the beams, to obtain a substantially random input state of polarization.

23. The apparatus of claim 21, wherein the polarization controller and feedback control are coupled to maximize a peak-to-peak swing of interference intensity of the light signals.

24. The apparatus of claim 23, wherein the polarization controller and feedback control are configured to maximize said peak-to-peak swing of interference intensity at a fixed phase difference between the two beams when caused to interfere.

25. The apparatus of claim 23, wherein the polarization controller and feedback control are configured to maximize said peak-to-peak swing of interference intensity at an arbitrary phase difference between the two beams when caused to interfere.

26. The apparatus of claim 23, wherein the polarization controller and feedback control are configured to maximize said peak-to-peak swing of interference intensity by adjusting a polarization state relation of the beams for one of the counter-propagating light signals while scrambling a polarization state relationship of the beams for another of the counter-propagating light signals.

27. The apparatus of claim 23, wherein the polarization controller and feedback control are configured to vary the relative polarization relation between the beams for one of the counter-propagating light signals by dithering at a given frequency and adjusting the polarization controller to minimize a response at the dithering frequency, whereby the two beams of the counter-propagating light signal are controlled to establish polarization characteristics that are one of parallel and orthogonal to an eigenmode of an effective birefringence network thereof.

28. The apparatus of claim 1, wherein the polarization controller is placed between the light source and said optical waveguide, such that the polarization controller simultaneously affects both the counter-propagating optical signals.

29. The apparatus of claim 28, further comprising at least one additional polarization controller, wherein said polarization controllers are operable to vary polarization properties for one of the two optical signals, by varying a polarization transformation for at least one of the counter-propagating optical signals while polarization transformations for both the counter-propagating optical signals are matched, at least relative to one another.

30. The apparatus of claim 29, wherein the said polarization controllers are operable to vary said polarization properties by scrambling the polarization transformation for said at least one of the counter-propagating optical signals.

31. The apparatus of claim 1, wherein the data processing unit is programmed to resolve a location of the disturbance in the detection zone from signals received at the detector.

32. The apparatus of claim 31, wherein the said data processing unit comprises at least one of a programmable gate array and a digital signal processor.

33. The apparatus of claim 1, wherein the at least one polarization controller is operable to hold a balance of polarization states in the counter-propagating optical channels, whereby said polarization states are made more likely to correspond during the disturbance.

34. The apparatus of claim 1, wherein the at least one polarization controller is operable to scramble the polarization in the counter-propagating optical channels.

35. The apparatus of claim 1, wherein the at least one polarization controller is operable to hold a relation in polarization states between the counter-propagating optical channels, for maintaining a state of interference between the optical channels.

36. The apparatus of claim 1, further comprising a data transmission path traversing the optical waveguide, supporting at least one optical data transmission signal.

37. The apparatus of claim 36, wherein an operating wavelength of the counter propagating optical beam is different from an operating wavelength of the optical data transmission signal.

38. The apparatus of claim 36, wherein the optical data transmission signal is carried over at least one same channel as the counter-propagating optical channels.

39. The apparatus of claim 1, further comprising a communication device operable to report information regarding the disturbance.

40. The apparatus of claim 39, wherein the communication device comprises one of a wired and wireless reporting link to a remote location.

41. A method for detecting and locating disturbances, comprising:
    establishing an optical system including at least one optical waveguide extending along at least one detection zone at which a disturbance can occur, so as to affect optical signals propagating along counter-propagating optical channels from at least one light source to a detector;
    separating from the at least one light source, and coupling into each of the counter-propagating optical channels, at least two beams;
    managing optical properties in the counter-propagating optical channels using a polarization controller to vary optical properties for at least one of the optical signals while propagating toward the detection zone;
    detecting the optical signals after traversing the detection zone and determining a difference between times at which effects of the disturbance appear in the respective counter-propagating channels after traversing said detection zone;
    calculating from said difference between times and localizing in the detection zone a place where the disturbance occurred;
    wherein said managing of the optical properties comprises providing a control signal to the polarization controller that maintains a signal-to-noise ratio and minimizes a contribution to said difference between times caused by polarization effects, including at least one of:
        seeking a predetermined relationship between polarization phase transformations along the counter-propagating optical channels,
        maximizing a peak swing in intensity at a point of interference of the beams, and
        varying an input state of polarization for one of testing and adjusting a balance between said polarization transformations for the counter-propagating channels.

42. The method of claim 41, further comprising tuning a wavelength of the light source.

43. The method of claim 41, wherein said separating comprises dividing a portion of light energy from a single beam source separately into each of the counter-propagating optical channels, respectively.

44. The method of claim 41, wherein the counter-propagating channels are established through at least one optical fiber extending through the detection zone.

45. The method of claim 41, wherein the counter-propagating channels are established through at least two optical fibers extending through the detection zone.

46. The method of claim 41, comprising managing said optical properties to obtain substantially equal optical phase transformations through said counter propagating channels.

47. The method of claim 41, wherein said detection zone defines a portion of an interferometer and further comprising developing said intensity signal at a point of interference of said beams.

48. The method of claim 41, comprising applying the polarization controller to transform the optical properties of at least one beam of the counter propagating optical channels from a first arbitrary state of polarization to a second arbitrary state of polarization.

49. The method of claim 41, wherein varying the input state of polarization comprises producing a substantially random input state of polarization.

50. The method of claim 49, further comprising successively varying said input state.

51. The method of claim 41, comprising adjusting a polarization state relation of the beams for one of the counter-propagating light signals while scrambling a polarization state relationship of the beams for another of the counter-propagating light signals.

52. The method of claim 41, comprising varying a relative polarization relation between the beams for one of the counter-propagating light signals by dithering at a given frequency and adjusting the polarization controller to minimize a response at the dithering frequency, whereby the two beams of the counter-propagating light signal are controlled to establish polarization characteristics that are one of parallel and orthogonal to an eigenmode of an effective birefringence network of the beams.

53. The method of claim 41, comprising placing at least one said polarization controller between the light source and said optical waveguide, such that the polarization controller simultaneously affects both the counter-propagating optical signals.

54. The method of claim 53, further comprising placing at least one additional said polarization controller so as to vary polarization properties for one of the two optical signals.

55. The method of claim 41, comprising varying a polarization transformation for at least one of the counter-propagating optical signals while polarization transformations for both the counter-propagating optical signals are matched, at least relative to one another.

56. An improved method for detecting and locating disturbances affecting an optical system including at least one optical waveguide extending along at least one detection zone at which a disturbance can occur, thereby affecting optical signals propagating along counter-propagating optical channels from at least one light source to a detector, wherein at least two beams are separated from the at least one light source and coupled into each of the counter-propagating optical channels, and an effect of the disturbance is detected after the beams have traversed the detection zone and a time difference is determined for calculating a location of the disturbance in the detection zone, wherein the improvement comprises:

managing optical properties in the counter-propagating optical channels using a polarization controller to vary optical properties for at least one of the optical signals while propagating toward the detection zone, wherein said managing includes providing a control signal to the polarization controller that maintains a signal-to-noise ratio and minimizes a contribution to said difference between times caused by polarization effects, and comprises at least one of:

seeking a predetermined relationship between polarization phase transformations along the counter-propagating optical channels, maximizing a peak swing in intensity at a point of interference of the beams, and varying an input state of polarization for one of testing and adjusting a balance between said polarization transformations for the counter-propagating channels.

* * * * *

UNITED STATES PATENT AND TRADEMARK OFFICE
CERTIFICATE OF CORRECTION

PATENT NO.         : 7,142,736 B2                             Page 1 of 1
APPLICATION NO.    : 10/919547
DATED              : November 28, 2006
INVENTOR(S)        : Patel et al.

It is certified that error appears in the above-identified patent and that said Letters Patent is hereby corrected as shown below:

Title Page, Item (75) Inventor is corrected to read:
-- Jayantilal S. Patel, Newtown (PA);
   Zhizhong Zhuang, Bensalem (PA);
   Yuri Zadorozhny, West Trenton (NJ);
   Brian Bourke, Beaumaris (AU);
   Lee J. McIntosh, Clovelly (AU) --.

Signed and Sealed this
Twenty-ninth Day of December, 2015

Michelle K. Lee
*Director of the United States Patent and Trademark Office*